(12) United States Patent
Shimazaki et al.

(10) Patent No.: US 7,027,385 B1
(45) Date of Patent: Apr. 11, 2006

(54) OPTICAL DISK, DISK SUBSTRATE, AND DRIVE

(75) Inventors: Katsusuke Shimazaki, Toride (JP); Yuuji Yamazaki, Toride (JP); Hikaru Mizutani, Minoh (JP); Tsuyoshi Maro, Otokuni-gun (JP); Kenji Ohta, Otokuni-gun (JP); Hiroyoshi Takagi, Kameoka (JP); Katsuhiro Takahashi, Kyoto (JP)

(73) Assignee: Hitachi Maxell, Ltd., Ibaraki (JP)

(*) Notice: Subject to any disclaimer, the term of this patent is extended or adjusted under 35 U.S.C. 154(b) by 0 days.

(21) Appl. No.: 09/830,928

(22) PCT Filed: Nov. 8, 1999

(86) PCT No.: PCT/JP99/06202

§ 371 (c)(1),
(2), (4) Date: May 24, 2001

(87) PCT Pub. No.: WO00/28538

PCT Pub. Date: May 18, 2000

(30) Foreign Application Priority Data

Nov. 6, 1998 (JP) .................................. 10-315847
Mar. 15, 1999 (JP) .................................. 11-068489

(51) Int. Cl.
*G11B 3/70* (2006.01)

(52) U.S. Cl. ...................................... 369/281
(58) Field of Classification Search ................ 369/282, 369/290, 291, 13.24, 112.16, 280, 77.1, 13.29, 369/44.12, 112.01; 360/99.12, 99.08; 428/64.1; 720/723; 368/181
See application file for complete search history.

(56) References Cited

U.S. PATENT DOCUMENTS

| | | | | |
|---|---|---|---|---|
| 4,785,444 A * | 11/1988 | Nakane et al. | ............... | 369/282 |
| 5,058,094 A * | 10/1991 | Suzuki | ....................... | 369/77.1 |
| 5,323,381 A * | 6/1994 | Takahashi et al. | .......... | 369/282 |
| 5,448,547 A * | 9/1995 | Minoda et al. | ............. | 369/280 |
| 5,581,423 A * | 12/1996 | Yokouchi | ................. | 360/99.08 |
| 5,592,459 A * | 1/1997 | Kasahara | ................. | 369/44.21 |
| 5,731,929 A * | 3/1998 | Chaya | ..................... | 360/99.12 |
| 5,867,346 A * | 2/1999 | Teshima | ................. | 360/99.08 |
| 5,987,003 A * | 11/1999 | Yokota | ....................... | 369/280 |
| 5,987,004 A * | 11/1999 | Suwabe | ....................... | 720/723 |
| 6,014,365 A * | 1/2000 | Tanaka | ....................... | 369/291 |
| 6,154,441 A * | 11/2000 | Sandstrom et al. | ......... | 369/282 |
| 6,162,519 A * | 12/2000 | Takakuwa et al. | ......... | 428/64.1 |
| 6,165,578 A * | 12/2000 | Ohno et al. | ................ | 428/64.1 |
| 6,222,812 B1 * | 4/2001 | Yoo et al. | ............. | 369/112.16 |
| 6,243,326 B1 * | 6/2001 | Sumi et al. | ............. | 369/13.29 |
| 6,256,283 B1 * | 7/2001 | Fukakusa et al. | ....... | 369/112.01 |
| 6,266,298 B1 * | 7/2001 | Tsai | ........................ | 369/13.24 |

FOREIGN PATENT DOCUMENTS

JP 54-133115 10/1979
JP 62-46446 2/1987

(Continued)

*Primary Examiner*—Tianjie Chen
(74) *Attorney, Agent, or Firm*—Oliff & Berridge, PLC

(57) ABSTRACT

An optical disk 100 is provided with a hub 3 at the central portion of a substratel. A relationship $Y/X \geq 0.015$, preferably $Y/X \geq 0.05$ is satisfied where X is the projected area of the substrate 1 and Y is a contact area between the hub 3 and the substrate 1. As result, no slippage occurs between the hub 3 and the substrate 1 even when they are rotated at high speed than conventional. With this higher rotational speed, the data transfer rate is improved, and irregular rotation and the camming are suppressed, thereby reducing tracking errors and write/read errors.

18 Claims, 21 Drawing Sheets

FOREIGN PATENT DOCUMENTS

| | | | |
|---|---|---|---|
| JP | 1-103054 | 7/1989 | |
| JP | 3-263667 | 11/1991 | |
| JP | 03259452 A | * 11/1991 | |
| JP | 5-128776 | 5/1993 | |
| JP | 6-84314 | 3/1994 | |
| JP | 6-111518 | 4/1994 | |
| JP | 06111518 A | * 4/1994 | |
| JP | 6-43850 | 6/1994 | |
| JP | 8-87853 | 4/1996 | |
| JP | 8-195023 | 7/1996 | |
| JP | 8-321072 | 12/1996 | |
| JP | 10-27418 | 1/1998 | |
| JP | 10081964 A | * 3/1998 | |
| JP | 10-208297 | 8/1998 | |
| JP | 10-269620 | 10/1998 | |
| JP | 11-16234 | 1/1999 | |

* cited by examiner

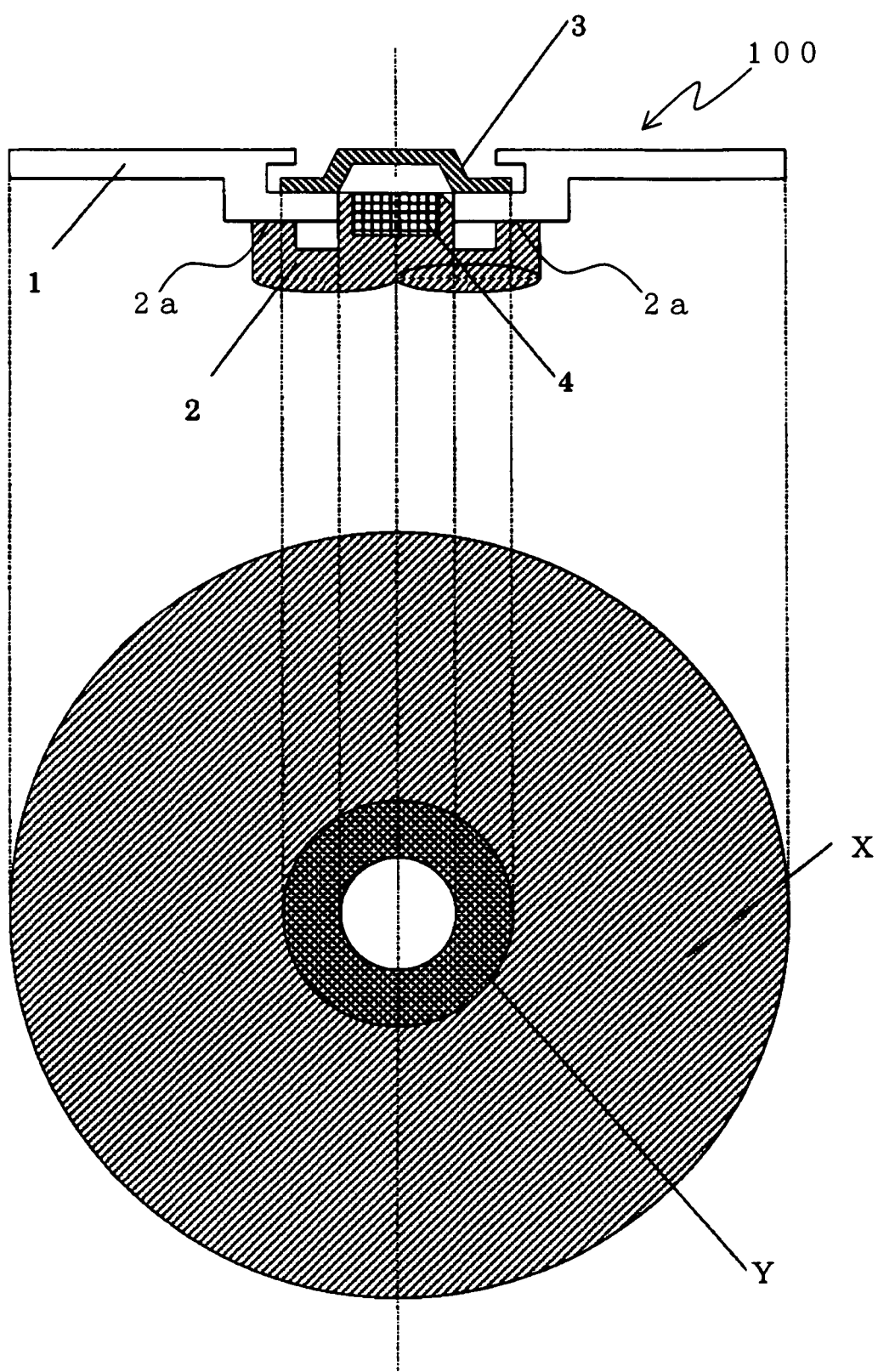

Fig. 4A
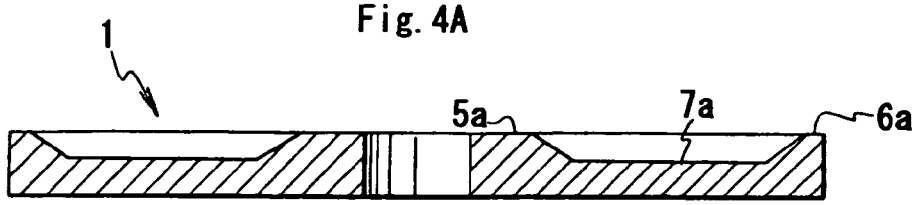
Fig. 4B
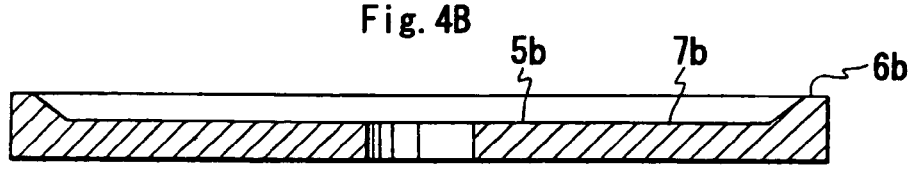
Fig4. C
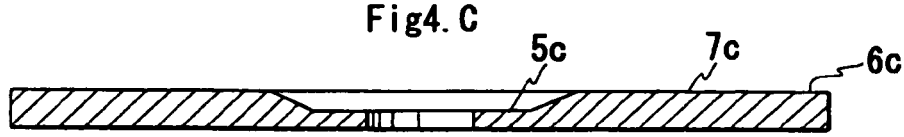
Fig. 4D
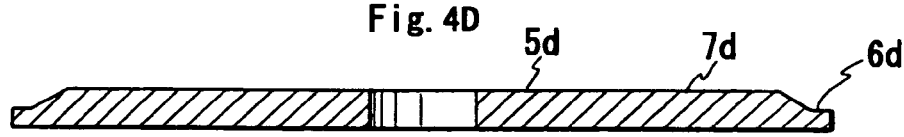
Fig. 4E
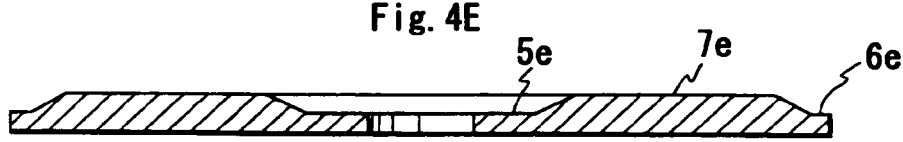
Fig. 4F
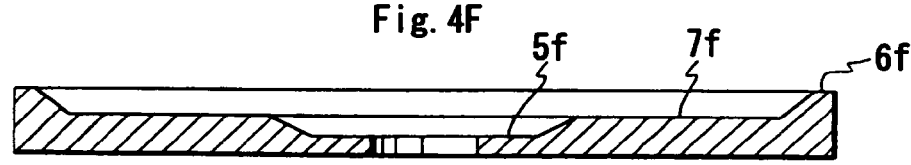
Fig. 4G
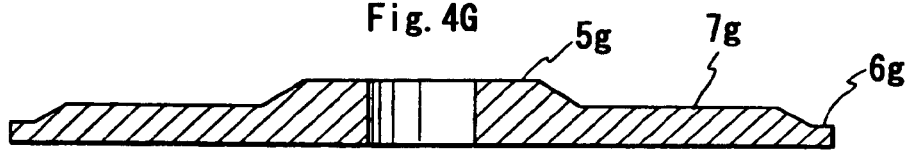
Fig. 4H
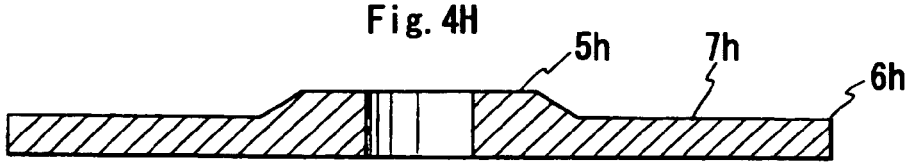
Fig. 4I

Fig. 12A
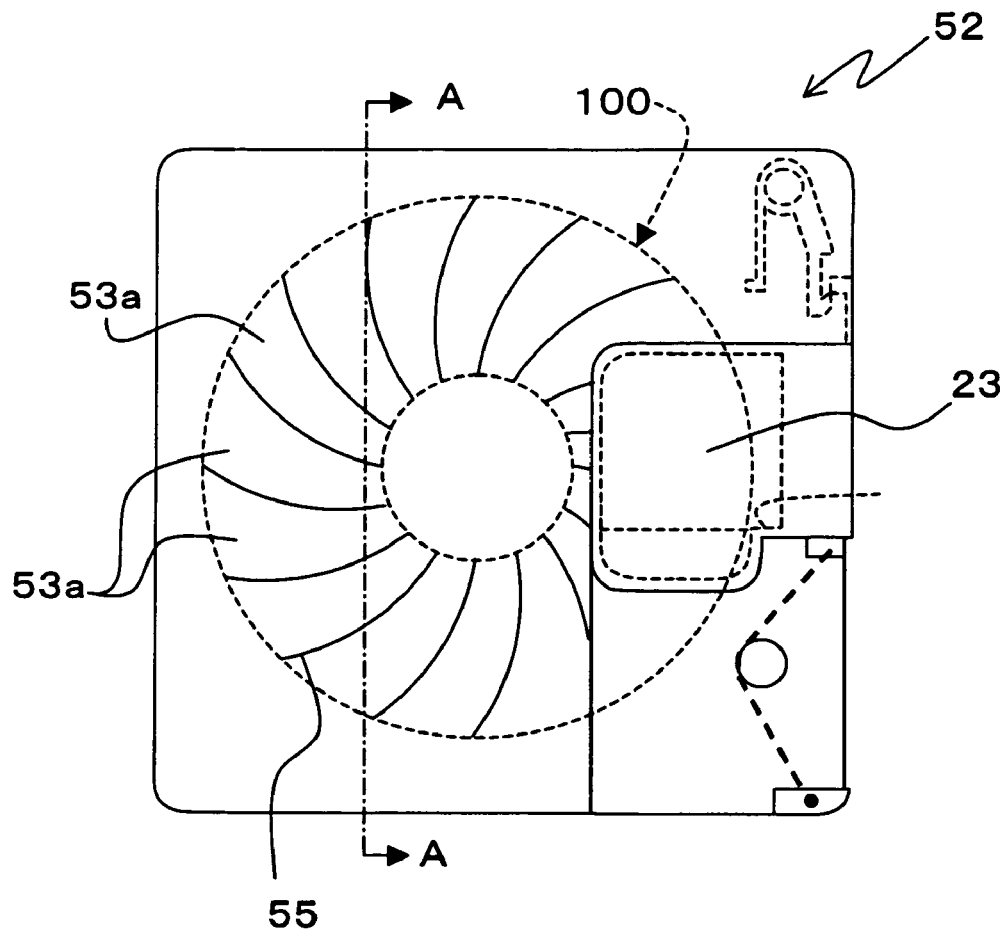
Fig12. B
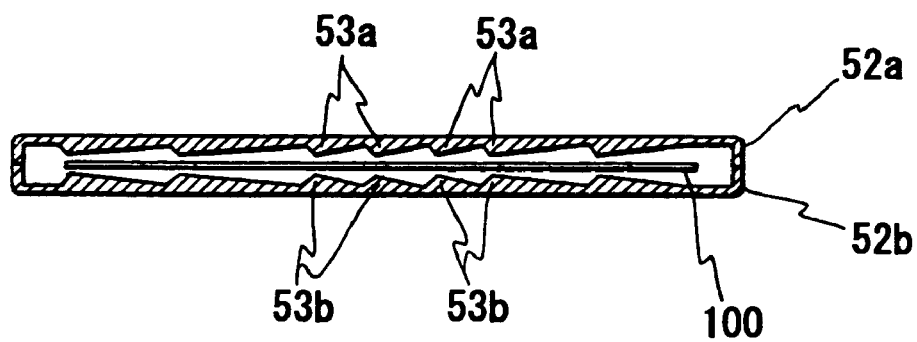

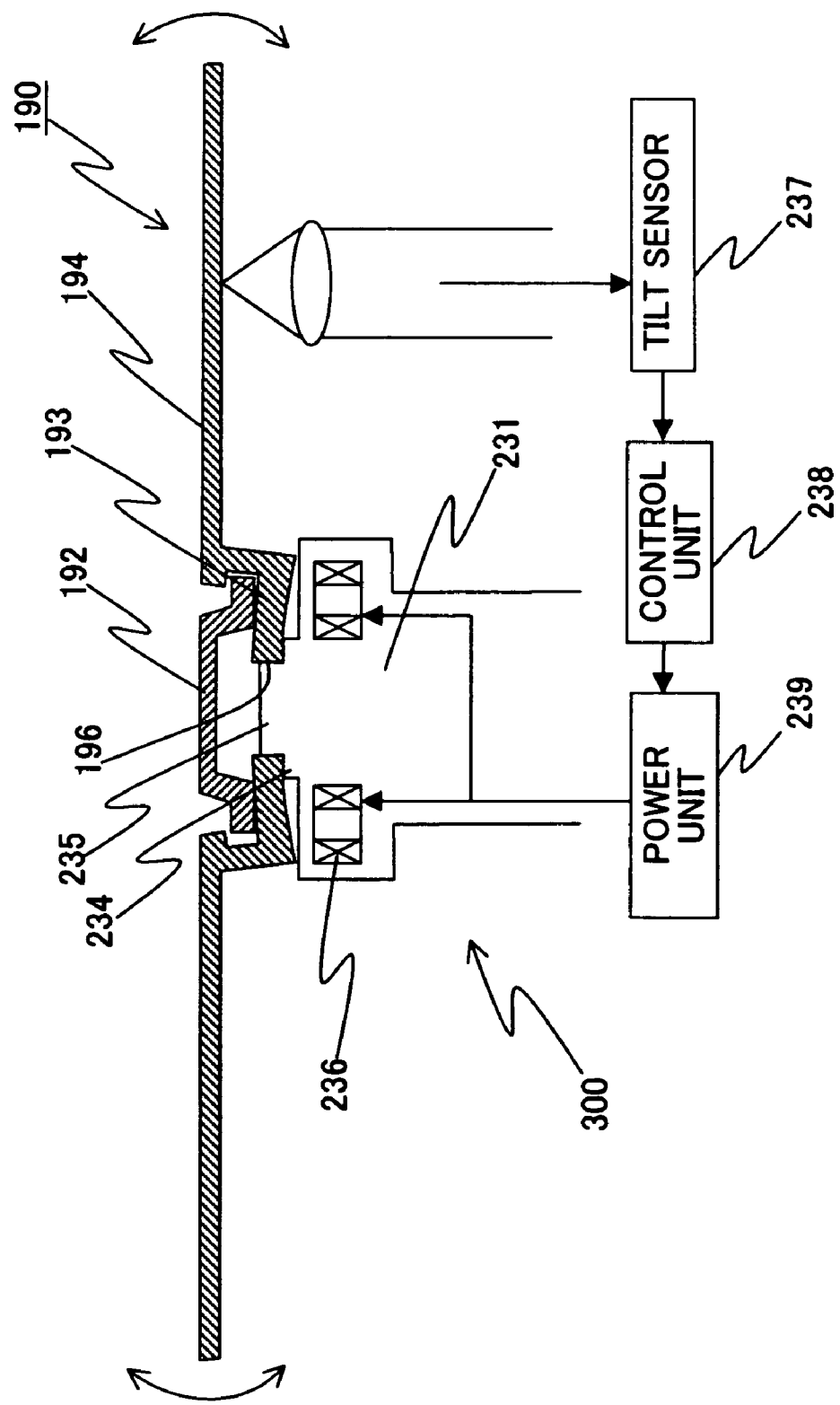

OPTICAL DISK, DISK SUBSTRATE, AND DRIVE

TECHNICAL FIELD

The present invention relates to an optical disk chucked and rotating with a spindle, and to a substrate for an optical disk. The invention also relates to a driving apparatus for rotating an optical disk. In more detail, the invention relates to an optical disk having high data reliability and rotation stability even if it rotates at high speed, a substrate used for a record disk which can be kept horizontal while it is rotating, and a driving apparatus which can rotate a record disk while always keeping it horizontal.

BACKGROUND ART

Magneto-optical disks are widely used as external memories for computers etc. A mechanical clamping system and a magnetic clamping system are adopted for mounting magneto-optical disks on recording and reproducing apparatus. Unlike the mechanical clamping system, the magnetic clamping system needs no device for fixing a magneto-optical disk. As shown in FIG. 1, the magnetic clamping system involves supporting a substrate 1 on the support surface 2a of a spindle 2. The substrate 1 is fitted with a hub 3. The spindle 2 includes a magnet 4 embedded in it. This system also involves making the magnet 4 attract the hub 3 to urge an inner circumferential portion of the reverse side of the substrate 1 against the support surface of the spindle 2. This system can make the apparatus small in comparison with the mechanical clamping system, but has the problem of retardation that the difference between the coefficients of thermal expansion of the plastic substrate and the hub develops a deforming stress in the substrate when the ambient temperature changes. This retardation disturbs the states of polarization of the recording light and reproducing light for the magneto-optical disk, and may consequently degrade the recording and reproducing characteristics.

As a means to solve this problem, a structure of an optical disk as shown in FIG. 2 is proposed in Japanese Patent Application Laid-Open No. 62-46446, for example. This optical disk includes a magnetic clamping hub 3, which is not fixed to a substrate 1 but can move relative to it. As shown in FIG. 2, a spindle 2 is fitted with a magnet 4, which attracts the clamping hub 3 and simultaneously urges it against the substrate 1 so that the disk can rotate with the spindle 2. Since the clamping hub 3 and the substrate 1 are not fixed together, there occurs no retardation resulting from the difference between their coefficients of thermal expansion.

However, researches of the inventors revealed that, when a medium on the magnetic clamping system is rotated in a recording and reproducing apparatus at a speed higher than 720 rpm for a higher transfer rate, the apparatus vibrates, frequently causing tracking errors and/or data write/read errors. The researches also revealed that this phenomenon is more remarkable when the medium rotates at higher speed. This is conceived to be because the magneto-optical disk rotates irregularly due to the slip caused since the torque of the disk is greater than the frictional force acting between the substrate and the magnetic clamping hub. Furthermore, the above-mentioned errors result from the camming and/or the disordered flow of air (turbulence) caused by the irregular rotation.

If the substrate is thinner for higher record density, it is less rigid. This makes the torque of the spindle apt to cause camming and deformation of the disk. The camming and the deformation may make the disk rotation irregular and cause turbulence.

If the magneto-optical disk rotates at higher speed in a cartridge case, the disk rotation causes more turbulence in the cartridge. The turbulence is conceived to affect the rotational stability of the disk. The turbulence is also conceived to increase the rotational instability and camming of the disk.

When the disk rotates at higher speed, the spindle motor generates a larger amount of heat than conventionally. The disk is conceived to be affected by a great amount of heat transfer to its substrate. While the disk is rotating at high speed, it is charged by the friction between the disk surfaces and air. This is conceived to make a larger amount of dust stick to the disk. In particular, because an optical disk including a thin substrate is apt to be charged, a remarkable amount of dust sticks to the disk.

Then, the inventors tried to prevent the slip between a substrate and a magnetic clamping hub by making the magnetic attraction of a spindle greater than conventionally by replacing the magnet of the spindle with one greater in magnetic force, but the signal quality deteriorated. This is conceived to be because the too strong magnetic field from the spindle magnet affects the magneto-optical signals.

Information can be recorded on and reproduced from a magneto-optical disk or another optical record medium with light radiated onto the medium. The angle between the optical axis of the incident light and the medium (recording layer) influences the recording and reproducing performance very greatly. Therefore, when information is recorded and reproduced, it is most preferable that the light be incident at right angles with the recording surface of the optical record medium. In many actual cases, however, the angle between the recording surface of an optical record medium and the incident light is not right because of the substrate warpage caused when the medium is manufactured, setting errors of the optical system of a driving apparatus, and the disk distortion due to changes in environmental temperature and humidity. In particular, a plastic substrate for an optical record medium which is 0.8 mm or thinner is less rigid. It is therefore difficult to prevent the substrate from being warped and/or distorted.

The angle between the medium surface and the incident light greatly affects the coma aberration, which increases in proportion to the third power of the angle of inclination from the perpendicular direction. In other words, if the medium surface inclines with respect to the optical axis of the incident light, the focal spot becomes substantially large in diameter. This may prevent a desired record mark from being recorded. If coma aberration is produced when information is reproduced, it is difficult to reproduce a recorded mark with sufficient resolution.

Conventionally, the problem which originates from the tilt of a desired position on a surface of a medium with respect to the optical axis of incident light has been met with the precision assembly technique for the optical system of a driving apparatus and the technique for making flat optical record media. This problem of the tilt may be solved by a known method called a tilt servo. The method includes detecting the tilt of an optical record medium through the optical system of a driving apparatus, and moving the optical system itself, to control the optical axis of the incident light so that the axis is perpendicular to the medium surface. This method, however, requires a drive mechanism for moving the optical system accurately. This makes the apparatus structure complex and costly. This method also requires a certain amount of time for driving the optical system to make the optical axis of the incident light perpendicular to the medium surface. This makes it difficult to manufacture a quickly responsive recording and reproducing apparatus.

In consideration of the foregoing problems, a first object of the present invention is to provide an optical disk for which it is possible to suppress camming and irregular rotation by preventing the substrate and hub of the disk from slipping on each other when the disk is rotated at high speed.

A second object of the present invention is to provide a substrate for a record disk having a recording surface that can be perpendicular to the optical axis of the light incident on the surface when information is recorded on and reproduced from the disk.

A third object of the present invention is to provide a driving apparatus that can keep a record disk horizontal by correcting the tilt of the disk while the disk is rotated.

DISCLOSURE OF THE INVENTION

In accordance with a first aspect of the present invention, an optical disk is provided, which includes a substrate in the form of a disk and a recording layer which lies on the substrate and on which information can be recorded. The substrate has a hole formed through its center and is fitted with a hub at its center. X denotes the projected area of the substrate. Y denotes the contact area between the hub and the substrate. The optical disk is characterized by satisfying the relationship of $Y/X \geq 0.015$.

The optical disk according to the present invention is characterized in that the contact area Y between the magnetic clamping hub and the substrate is no less than 1.5% of the projected area X of the substrate. In other words, this disk is characterized by the ratio of Y to X (Y/X) being 0.015 or more. By determining the contact area between the substrate and the magnetic clamping hub so as to satisfy the above relationship, it is possible to increase the frictional force between the substrate and the hub, if the contact area between the substrate and the supporting surface of a spindle for rotating the optical disk is constant. Consequently, the camming and irregular rotation of the optical disk are suppressed even if it is rotated at high speed during the recordation and reproduction of information, since the force for holding the substrate is greater than conventionally. It is preferable that the ratio of the contact area Y to the projected area X of the substrate be higher for higher speed at which the optical disk rotates. Since the practical rotation speed is limited by the spindle motor for rotating the optical disk, it is more preferable that the ratio range from 2 to 7%.

For higher recording density, the substrate thickness of the recording region may be 0.7 or less mm. Even in such a case, it is possible to improve the rigidity of the whole substrate by making the substrate thicker than 0.7 mm outside the recording region or fixing to a part of the substrate a reinforcing member having higher tensile strength than the substrate. The improved rigidity makes it possible to suppress the camming of the substrate. Accordingly, the irregular rotation of the optical disk and/or turbulent flow can be suppressed more effectively by a synergistic effect of determining the contact area between the substrate and the magnetic clamping hub so that the above-mentioned relationship is satisfied.

The optical disk according to the present invention may be constructed as an optical disk cartridge equipped with a cartridge case, in which the disk is held rotatably. At least one of a protrusion and a recess may be formed on the inner wall surface of the cartridge case opposing to the disk, in order to adjust air flow when the disk rotates. Since this can suppress turbulence caused while the disk is rotating, the disk can be rotated in the cartridge case stably without camming.

In accordance with a second aspect of the present invention, a magneto-optical disk is provided, which includes a substrate having a hole through its center, a recording layer on the substrate, and a hub at the center of the substrate. The magneto-optical disk is characterized by the hub having an outer diameter that is 26 or more % of that of the disk.

The optical disk according to the second aspect of the invention includes a hub having an outer diameter 26 or more % of that of the disk. Therefore, the optical disk can be rotated at higher speed than the conventional speed without slip between the substrate and the hub. In addition, since camming and/or irregular rotation is reduced which occurs while the optical disk is rotating, it is possible to record information on and reproduce information from the disk rotating at higher speed than the conventional speed.

It is more preferable that the ratio in outer diameter of the hub to the optical disk range between 28 and 40% for a sufficient recording region of the disk.

In accordance with a third aspect of the present invention, a substrate in the form of a disk is provided for an optical disk. The disk substrate is characterized by its disk plane tilting substantially with respect to a plane perpendicular to its rotational axis.

The substrate according to the third aspect of this invention has a disk plane including a recording region. The disk plane tilts substantially upward or downward with respect to a plane perpendicular to the rotational axis of the disk. This substrate may be produced by the injection molding method, where molten resin is injected into a mold. A substrate formed by the injection molding method usually tends to tilt (warp) toward the stamper. For this reason, the conventional molding method has provided a temperature gradient to a mold so that the substrate should not warp. However, since the substrate according to the present invention has a structure tilted positively as mentioned above, no strict temperature control of the mold is required. This makes it easier to manufacture the substrate than by the conventional method. In order to manufacture the substrate according to this invention, the stamper face and the face opposing to the stamper and forming a cavity may be properly tilted with respect to a plane perpendicular to the axis of the mold according to a tilt angle. The tilt angle of the molded substrate may preferably be set within a range of ±7 milliradians (mrad) around a reference angle of 10 mrad to a horizontal plane.

In this application, the phrase "tilting substantially upward or downward" implies that a substrate is manufactured with an upward or downward tilt angle of 3 or more mrad as a design value. When a disk substrate is manufactured by the injection molding method, there usually occurs a variation of ±3 mrad at the maximum in the tilt angle between the disk plane and a plane perpendicular to the rotational axis. Therefore, if a tilt angle of 3 or more mrad is preset as a manufacturing error relative to a design value in a process of manufacturing a substrate, the manufactured substrate will certainly have an upward or downward tilt even taking the manufacturing error into consideration. In this application, if the top and bottom surfaces of a disk are not parallel, the terminology "disk plane" implies the plane formed by the middle between the surfaces.

The disk substrate according to the third aspect of this invention may, as shown in an upper part of FIG. 19, consist of a magnet chucking hub 192, a cylindrical hub holder 193 for holding the hub 192, and a main body (disk plane) 194 extending radially from the peripheral wall of the holder 193. This substrate 194 tilts at an angle θ with a horizontal plane away from the bottom of hub holder 193. It is desirable that this angle θ range between 1 and 20 mrad. Such a substrate can form part of a record disk. Information can be recorded on and reproduced from the record disk with the tilt of its disk plane corrected, using a driving apparatus, which will be mentioned later, for example.

When an optical disk including a disk substrate according to the present invention is mounted on the driving apparatus mentioned later, the pressing force of the hub deforms the disk to control the tilt of the disk. For this control, it is preferable that the optical disk be able to deform with the magnetic attraction force applied to the hub by a magnet. Accordingly, the thickness of the disk plane of the substrate should preferably be less than 0.8 mm, and more preferably range between 0.1 and 0.7 mm.

The substrate can be formed out of any light-transmitting material, which may be transparent resin material such as polycarbonate, polymethylmethacrylate, polymethyl pentene and epoxy, or transparent ceramic material such as glass.

Various optical disks can be produced using the disk substrate according to the present invention. The disks may be optical disks for reproduction only, write-once type optical disks, magneto-optical disks and phase-transition type optical disks.

In accordance with a fourth aspect of the present invention, a substrate in the form of a disk is provided for an optical disk. The disk substrate is characterized by its disk plane having a thickness of less than 0.8 mm and a tilt angle θ between 1 and 20 mrad ($1 \text{ mrad} \leq \theta \leq 20 \text{ mrad}$) to a plane perpendicular to its rotational axis.

The disk plane of this disk substrate has a thickness of less than 0.8 mm. Therefore, when an optical disk including such a substrate is mounted on the driving apparatus mentioned later, and the pressing force of the hub deforms the disk to control the tilt, the optical disk can be surely deformed with the magnetic attraction force applied to the hub by a magnet. Since the disk plane has a thin thickness of less than 0.8 mm, an optical disk including such a substrate is suitable for high density recording.

Like the disk plane of the disk substrate according to the third aspect, the disk plane of the substrate according to the fourth aspect has a tilt relative to a plane perpendicular to the rotational axis. Accordingly, as stated earlier, no strict temperature control is required in the injection molding process. It is more preferable that the tilt angle of the disk plane range between 10 and 20 mrad. There is no conventional substrate manufactured with its substrate plane (middle plane) tilted in advance with respect to a plane perpendicular to the rotational axis, like the substrate according to the present invention.

In accordance with a fifth aspect of the present invention, a driving apparatus is provided for driving a record disk equipped with a hub attracted magnetically to press a part of the disk. The driving apparatus is characterized by including a support for supporting a part of the record disk in order to adjust the tilt of the disk.

This driving apparatus includes a support for supporting a part of a record disk. The supported part may be the underside of an inner peripheral portion of the disk. When the record disk is mounted on the driving apparatus, the driving apparatus can adjust the tilt of the disk at the support. The support may be formed at the top end of a shaft for rotating the record disk. This driving apparatus enables an optical disk to rotate with its disk plane kept approximately horizontal (10 or less mrad) with respect to a plane perpendicular to the rotational axis. This makes it possible to record information on and/or reproduce information from the optical disk without fail, with recording light and/or reproducing light incident perpendicularly to the disk plane without coma aberration.

This driving apparatus may be used with an optical disk as shown in FIG. 19. In this case, the shaft 210 for rotating the record disk 190 may have a recess 221 formed in its top for engagement with the hub holder 193 of the record disk. A horizontal support 223 extends radially outward from the top of a cylindrical wall 222, which makes up the recess 221. The bottom 221a of the recess 221 may be formed with a first protrusion (seat) 224 protruding coaxially with the shaft 210. The first protrusion 224 is larger in diameter than the center hole 196 of the record disk 190. The bottom of the hub holder 193 of the record disk 190 seats on this protrusion 224. The first protrusion 224 has a second protrusion (spindle head) 225 protruding coaxially with the shaft 210. The second protrusion 225 may have a size for engagement with the center hole 196 of the record disk 190. A permanent magnet 226 is laid annularly under the recess 221 around the first protrusion 224. The magnet 226 magnetically attracts the hub 192 on the record disk 190. It is preferable that the record disk be produced with a tilt, i.e., with a substrate according to the first aspect of the invention.

The principle of the operation of this driving apparatus will be explained below. The driving apparatus may be used with a record disk as shown in the upper portion of FIG. 19, where a record disk 190 includes a main body 194 tilted axially at an angle θ with a horizontal plane. The record disk 190 can be mounted on the shaft 210 of the driving apparatus, with the second protrusion 225 inserted into the center hole 196. As shown in FIG. 20, this fixes the radial position of the mounted disk 190, and causes the bottom of the hub holder to be supported on the top 224a of the first protrusion 224. At this time, the magnet 226 magnetically attracts the flange (rim) 192a of the hub 192, so that the flange 192a presses a peripheral portion 193a of the hub holder. The outer diameter of the first protrusion 224 is smaller than the inner diameter of the hub flange 192a. Therefore, as shown in FIG. 21, a peripheral portion of the bottom of the hub holder 193 is bent. This presses the underside of the main body 194 against the horizontal surface of the support 223 to keep the body 194 horizontal along this surface. Thus, since the record disk with a tilt rotates, being horizontally supported on the support 224, it is possible to keep recording/reproducing light incident perpendicularly to the plane of incidence of light 211. Even if there is a variation in the tilt of the plane of a manufactured record disk, the underside of the disk is pressed against the support of the rotating mechanism in a process of recording or reproducing information. This makes it possible to rotate the disk, correcting its tilt. This driving apparatus is quite suitable for driving record disks having disk substrates according to the third and fourth aspects of the invention.

In accordance with a sixth aspect of the present invention, a driving apparatus is provided for radiating the recording surface of a record disk with light to record information on and reproduce information from the disk. This driving apparatus is characterized by the record disk including a hub that can be magnetically attracted to press a part of the record disk, and by comprising:

a light source for irradiating the record disk with light;

a tilt sensor for measuring the tilt angle of the recording surface of the record disk relative to the optical axis of the light incident on the disk;

a rotating shaft for rotating the record disk;

an electromagnet embedded in the rotating shaft; and a controller for controlling the magnetic field intensity of the electromagnet based on the tilt angle detected by the tilt sensor, and for adjusting the pressing force of the hub that is applied to the disk plane of the record disk.

The driving apparatus according to the sixth aspect of the invention is equipped with a tilt sensor that detects the tilt (tilt angle) of the disk plane of a record disk while the disk is rotating. Based on the tilt angle detected by the tilt sensor, a controller adjusts the pressing force of the hub relative to the disk plane in such a manner that, while the optical disk is rotating, it is deformed so that the disk plane is approximately horizontal (at an angle of 10 or less mrad) with respect to a plane perpendicular to its rotational axis. Therefore, even if the optical disk has a substrate whose disk plane tilts with respect to a plane perpendicular to its rotational axis, the disk plane can be rotated almost horizontally with respect to the perpendicular plane. Accordingly, the driving apparatus is suitable for rotating optical disks with disk substrates according to the third and fourth aspects.

For example, FIG. 22 shows a record disk 190 that can be mounted on the driving apparatus according to the sixth aspect of the present invention. The record disk 190 has a hub holder formed in its center to hold a hub. In this case, the rotating shaft of the driving apparatus may have a disk support 231, on which the hub holder 193 of the record disk 190 can rest. The disk support 231 is formed with a first protrusion 234 protruding axially from its top 231a and a second protrusion (spindle head) 235 protruding axially from the first protrusion. The rotating shaft has an electromagnet 236 for magnetic attraction of the hub 192 on the record disk. The electromagnet 236 is embedded in the rotating shaft annularly around the first protrusion 234. The electromagnet 236 is connected to a power supply 239. Based on the control signal from a control unit 238, it is possible to control the amount of electric current supplied from the power supply 239. The controlled amount of electric current changes the magnitude of the magnetism of the electromagnet 236.

As shown in FIG. 22, the radial position of the record disk 190 on the disk support 231 of the rotating mechanism 300 is fixed with its center hole 196 engaging with the second protrusion 235. The magnetic attraction force of the electromagnet 236 causes the flange 192a of the hub 192 to press a peripheral portion of the hub holder 193. The pressing force of the hub 192 bends a peripheral portion of the hub holder 193 down around the first protrusion 234. This changes the tilt of the main body 194 of the record disk 190 relative to a horizontal plane. By adjusting the magnetic force of the electromagnet 236, it is possible to make the main body 194 have a desired tilt in the directions shown in FIG. 22. The driving apparatus is equipped with a tilt sensor 237 that can detect the tilt angle of the record disk. The tilt sensor 237 detects the tilt of the disk. Based on the detected signal, the control unit 238 controls the magnetic force of the electromagnet 236 so that the record disk is kept horizontal. By controlling the current from the power unit 239, it is possible to adjust the magnetism of the electromagnet 236. The light source used for the tilt sensor 237 and the source of recording/reproducing light may be in common.

A record disk that can be mounted on the driving apparatus according to the fifth aspect of the present invention may have a tilt mark, with which the signal detected by the tilt sensor varies with the tilt of the disk while the disk is rotating. This enables precise detection of the tilt of the rotating record disk, and can keep the disk horizontal.

BRIEF DESCRIPTION OF THE DRAWINGS

FIG. 3 is a cross section showing how an optical disk according to the present invention is chucked to a spindle.

FIG. 4A is a cross section of a substrate for an optical disk. FIGS. 4B through 4H are cross sections of various substrates for optical disks. FIG. 4I is a cross section of a conventional substrate for an optical disk.

FIG. 12A is a plan view of a cartridge case, showing the structure of a cartridge, where ridges are formed on the inside of the case in such a manner that they describe arcs radially. FIG. 12B is a cross section taken along line A—A of FIG. 12A.

FIG. 22 is a view typically showing the disk drive shaft of a driving apparatus according to the sixth aspect of the present invention.

BEST MODE OF THE INVENTION

Optical disks according to the present invention will be described below with reference to the drawings, but the invention is not limited to them.

FIG. 3 is a schematic cross section showing how a magneto-optical disk 100 according to the first aspect of the invention is mounted on the spindle 2 of a recording and reproducing apparatus.

Figure 6:
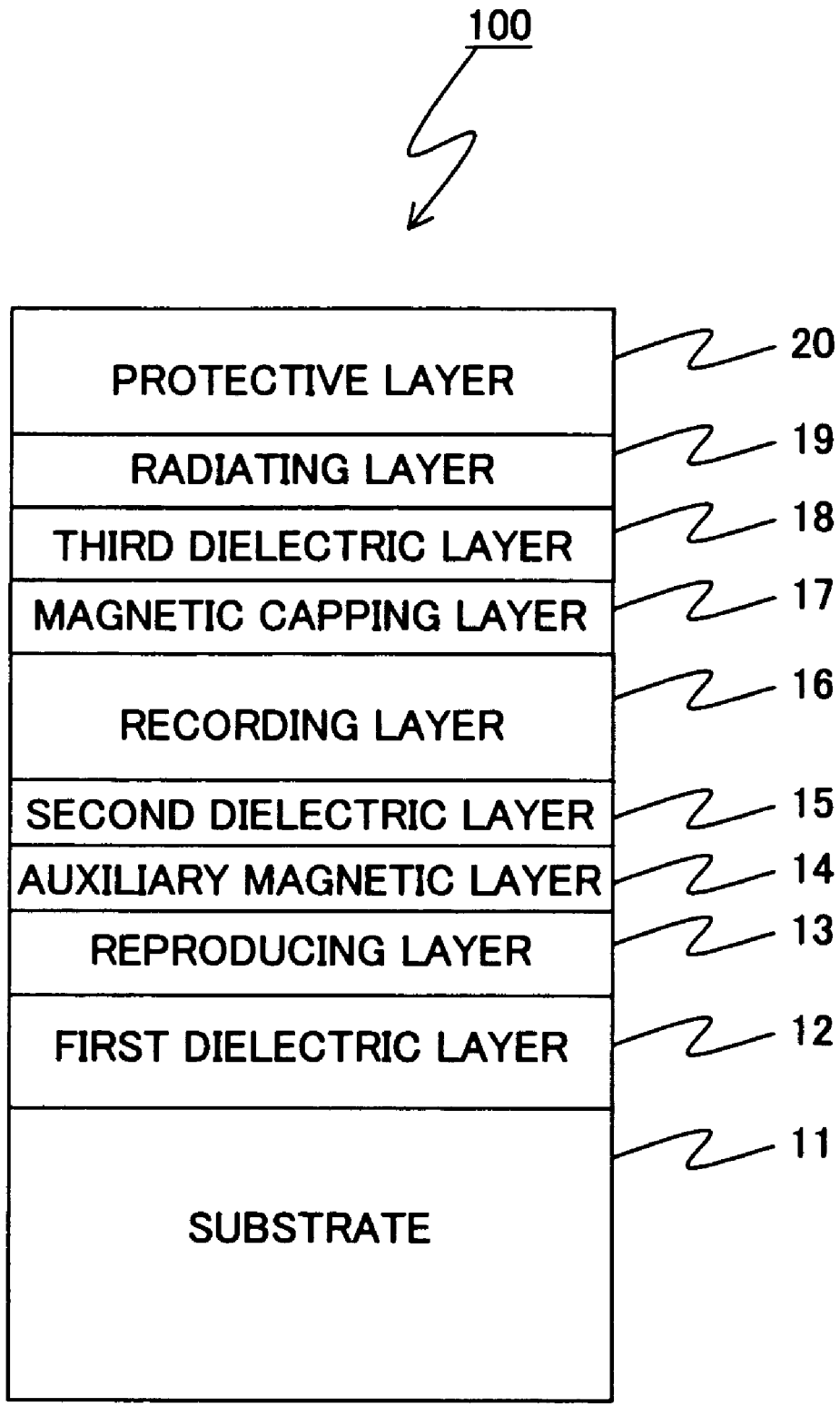
FIG. 6 is a cross section showing the laminated structure of a magneto-optical disk according to the present invention.

As shown in FIG. 6, the magneto-optical disk 100 includes a transparent substrate 11. The disk 100 also includes a first dielectric layer 12, a reproducing layer 13, an auxiliary magnetic layer 14, a second dielectric layer 15, a recording layer 16, a magnetic capping layer 17, a third dielectric layer 18, a radiating layer 19 and a protective layer 20, which are laminated in order on the substrate 11.

The transparent substrate 11 may be made of polycarbonate resin, epoxy resin, PMMA or other plastic material, and has a desired shape in the form of a disk. In order to prevent heat transfer from a spindle motor, it is preferable that the transparent substrate 11 be made of a material having a coefficient of heat conductivity of $10^{-3}$–$10^{-6}$ cal/° C.·cm·s. In the case of the transparent substrate 11 being used at a speed of rotation of 720 or more rpm, at which a large amount of heat is generated, it is preferable that the substrate be made of a material having a coefficient of heat conductivity of $10^{-4}$–$5 \times 10^{-6}$ cal/° C.·cm·s. In order to suppress camming of the transparent substrate 11, it is preferable that the Izod strength of the substrate be 5 or more kgf·cm/cm under the measuring method ASTM D256. In the case of the transparent substrate 11 being used at a speed of rotation of 720 or more rpm, at which the load on the substrate is heavy, it is preferable that the Izod strength be 5.5 or more kgf·cm/cm.

One side of the transparent substrate 11 has a guide groove for guiding a laser spot. This side also has preformat patterns in the form of fine pits consisting of prepit trains, which may represent the addresses of the recording tracks defined along the guide groove. Tracking servo signals and preformat signals can be read optically from this side.

FIGS. 4 and 5 show the forms of various substrates that can be used for the magneto-optical disk according to the first aspect of the invention. In FIG. 4A, which is a cross section, the positions of an inner region 5a and an outer region 6a and the difference between their thickness and the thickness of a recording and reproducing region 7a are exaggerated to be clear.

In FIG. 4B, in contrast with FIG. 4A, only an outer region 6b is thicker than an inner region 5b and a recording and reproducing region 7b. In FIG. 4C, an inner region 5c is thinner than an outer region 6c and a recording and reproducing region 7c. In FIG. 4D, an outer region 6d is thinner than an inner region 5d and a recording and reproducing region 7d. In FIG. 4E, an inner region 5e and an outer region 6e are thinner than a recording and reproducing region 7e.

In FIG. 4F, an inner region 5f is thinner than a recording and reproducing region 7f, which is thinner than an outer region 6f. In FIG. 4G, in contrast with FIG. 4F, an inner region 5g is thicker than a recording and reproducing region 7g, which is thicker than an outer region 6g. In FIG. 4H, an inner region 5h is thicker than an outer region 6h and a recording and reproducing region 7h.

FIG. 4I is a cross section of a conventional substrate for an optical disk, which is uniform in thickness. In FIGS. 4A through 4H, it is preferable that the inclinations between the adjacent regions different in thickness have angles between 5 and 80 degrees. The substrate shown in cross section in each of FIGS. 4A through 4H can be produced easily by the injection molding of polycarbonate or other resin with a mold shaped for the sectional structure of the substrate. Either side of the substrate shown in each of FIGS. 4A through 4H may be a signal surface, where a stamper forms pits of preformat patterns during the injection molding.

When the substrate shown in each of FIGS. 4A through 4H rotated, the amount of its camming was measured. The recording and reproducing region of the substrate has a thin thickness, which is 0.7 mm. Because this region differs in thickness from both or one of the other regions, however, the substrate is more rigid than the conventional substrate, the overall thickness of which is uniform. The rigid substrate can be restrained from deforming when it rotates, and its camming can be suppressed. It is also possible to suppress the occurrence of turbulence that would be caused in a cartridge case by the camming, and the increase in the irregular rotation of the substrate.

FIG. 5 shows other substrates that can be used for the magneto-optical disk according to the present invention. The substrate 1 includes a flat polycarbonate substrate for an optical disk. The substrate 1 also includes an annular rigid reinforcement 8a, which is concentric with it and fixed to an outer region 6 of its upper side with an adhesive or the like. The thickness of the rigid reinforcement 8a can be so adjusted that the total thickness of the reinforcement 8a and outer region 6 approximates a desired value. It is preferable that the radially inner side wall of the rigid reinforcement 8a slope at an angle of 45 or less degrees. It is also preferable that the rigid reinforcement 8a be made of the same material, such as polycarbonate, of which the substrate 1 is made, aluminum, iron, aluminum oxide, silicon oxide, titanium oxide, silicon nitride, titanium nitride, silicon carbide, or the like. For higher rigidity, it is further preferable that the reinforcement 8a be made of a material higher in tensile strength than the material for the substrate 1.

Figure 1:
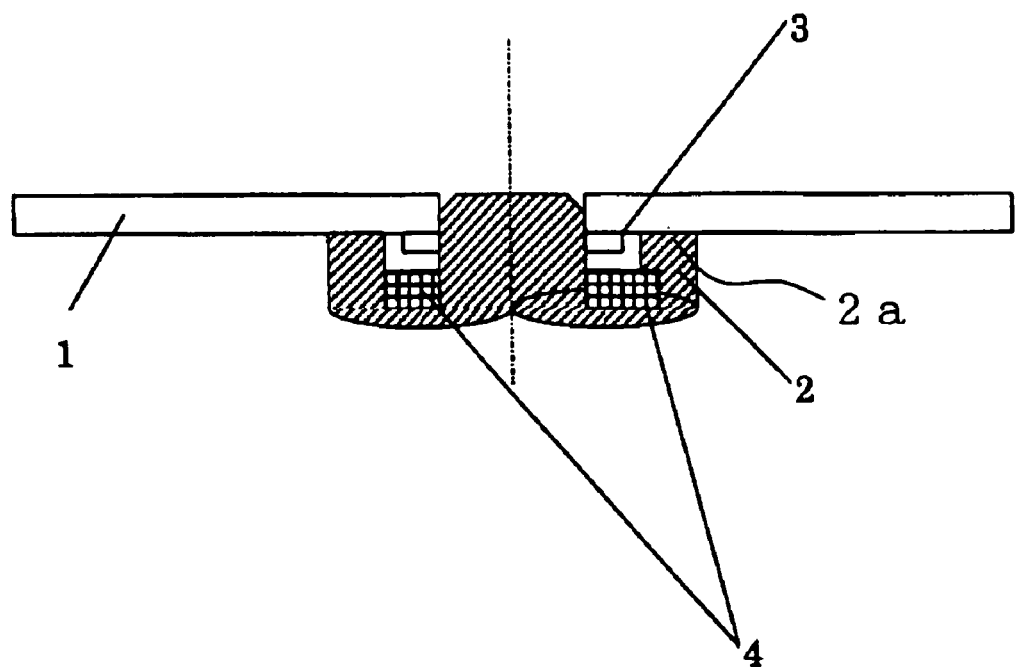
FIG. 1 is a schematic cross section of a conventional optical disk on the magnetic clamping system, where a hub is fixed to a substrate.
Figure 2:
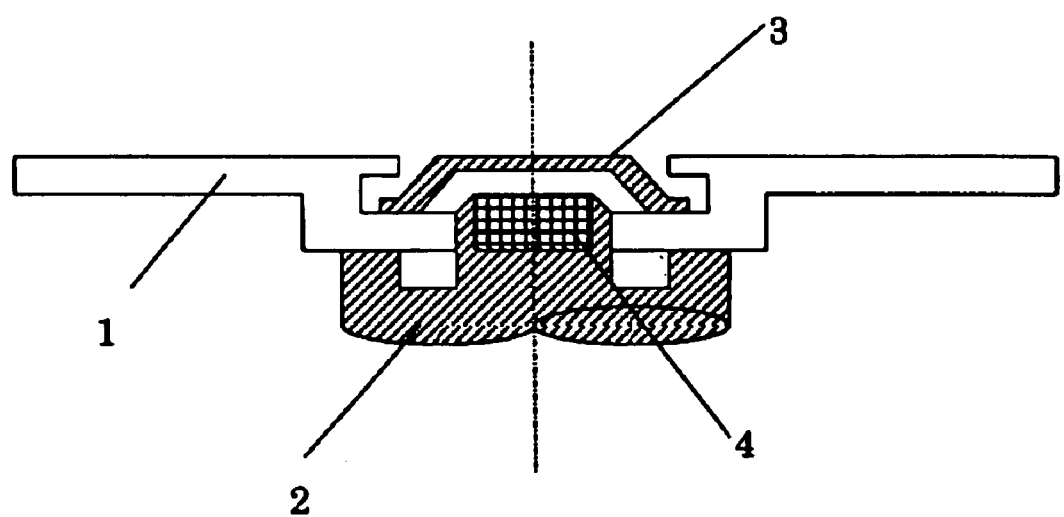
FIG. 2 is a schematic cross section of another conventional optical disk on the magnetic clamping system, where a hub is not fixed to a substrate.
Figure 5A:
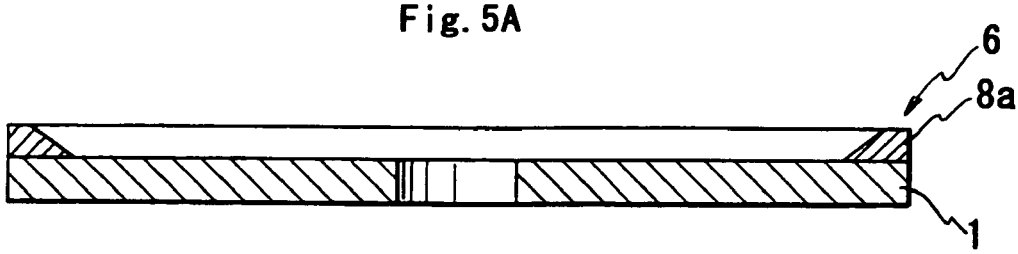
FIGS. 5A through 5G are cross sections of other substrates for optical disks.
Figure 5B:
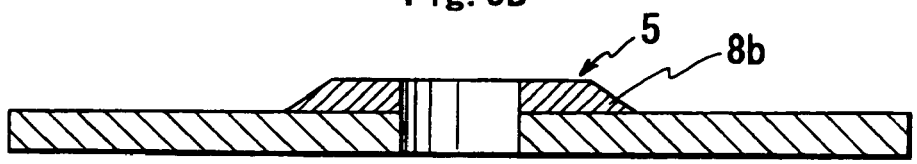
Figure 5C:
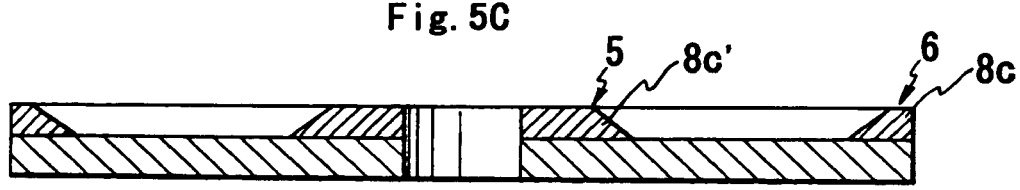
Figure 5D:
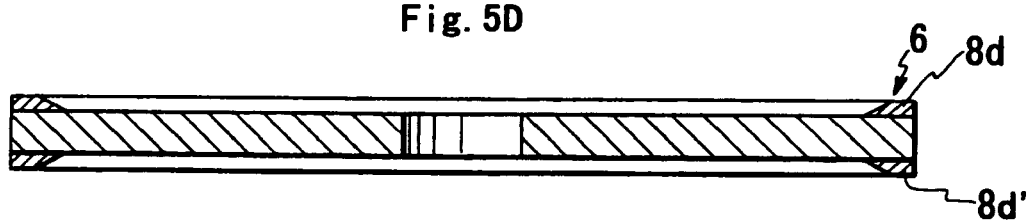
Figure 5E:
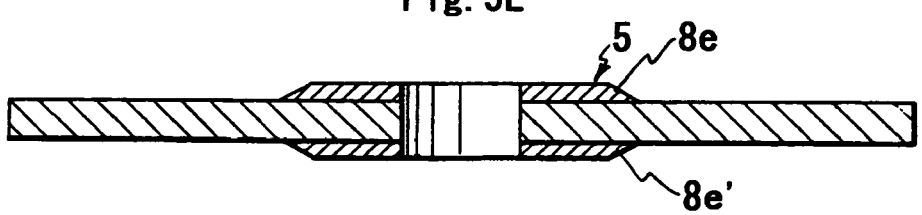
Figure 5F:
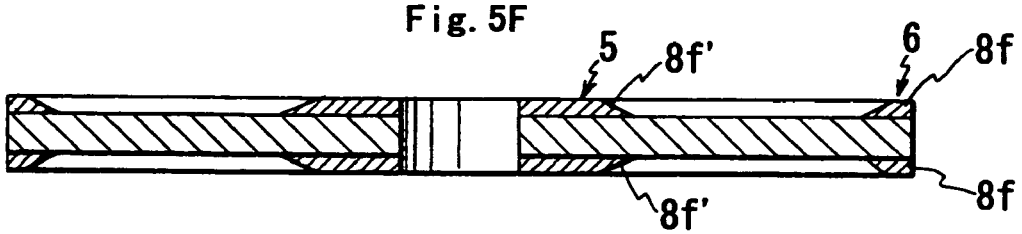

In FIG. 5B, a substrate 1 for an optical disk is concentric with an annular rigid reinforcement 8b, which is fixed to an inner region 5 of its upper side with an adhesive or the like. In FIG. 5C, a substrate 1 for an optical disk is concentric with annular rigid reinforcements 8c and 8c', which are fixed to an outer region 6 and an inner region 5, respectively, of its upper side with an adhesive or the like. In FIG. 5D, a substrate 1 for an optical disk is concentric with annular rigid reinforcements 8d and 8d', which are fixed to outer regions 6 of its upper and lower sides, respectively, with an adhesive or the like. In FIG. 5E, a substrate 1 for an optical disk is concentric with annular rigid reinforcements 8e, which are fixed to inner regions 5 of its upper and lower sides, respectively, with an adhesive or the like. In FIG. 5F, a substrate 1 for an optical disk is concentric with annular rigid reinforcements 8f and 8f', which are fixed to outer regions 6 and inner regions 5, respectively, of both its sides with an adhesive or the like.

Figure 5G:
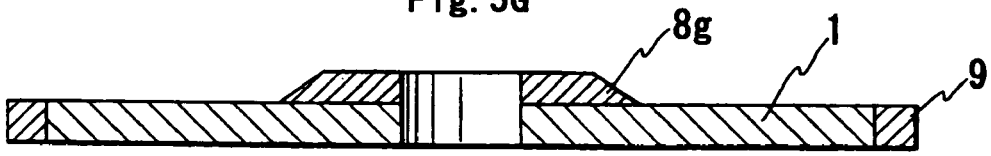

FIG. 5G shows a substrate similar to that shown in FIG. 5B, but this substrate includes a vibration absorber 9 surrounding its periphery. It is preferable that the vibration absorber 9 be made of urethane, silicone resin, vinyl chloride, butyl rubber or other rubber, polymeric material, or other elastic material. The substrate structure shown in FIG.

5G is effective for a record medium housed in a cartridge case, which will be mentioned later on. The substrates shown in FIGS. 5A through 5F may also include vibration absorbers stuck in various forms and positions to the rigid reinforcements 8, the inner regions 5, etc. for vibration isolation in various modes of vibration. It is possible to obtain optimum structure by selecting any of the substrate shapes shown in FIG. 4, and combining it with the elastic moduli and/or shapes of vibration absorbers.

In FIGS. 5B through 5G, the materials for the substrates 1 and reinforcements 8 and the thickness of the substrates 1 are similar to the materials for the substrate and reinforcement shown in FIG. 5A and the thickness of this substrate.

It is possible to improve the rigidity of the substrates 1 by fixing the rigid reinforcements 8 to the regions other than the recording and reproducing regions, as shown in FIGS. 5A through 5G.

When the substrate shown in each of FIGS. 5A through 5G rotated, the amount of its camming was measured. The camming was revealed to be suppressed in comparison with a conventional flat substrate having a thickness of 0.7 mm. The rigid substrate can be restrained from deforming when it rotates, and its camming can be suppressed. It is also possible to suppress the occurrence of turbulence that would be caused in a cartridge case by the camming, and the increase in the irregular rotation of the substrate.

As shown in FIG. 6, for example, two or more magnetic layers are laminated over a substrate having a shape selected from FIGS. 4 and 5. In FIG. 6, the first dielectric layer 12 is provided for multiple interference of light beams between the recording layer 16 and transparent substrate 11 to substantially increase the Kerr angle of rotation. This dielectric layer 12 is a film having a thickness between 200 and 1,500 angstroms (Å), and may be made of a nitride or an oxide of Si, Al, Zr, Ti or Ta, or another inorganic dielectric having a higher refractive index than the transparent substrate 11.

The reproducing layer 13 lies on the first dielectric layer 12. The reproducing layer 13 is a film having a thickness between 100 and 1,000 angstroms, and may be made of GdFeCo, GdFe, GdCo or other rare-earth transition-metal amorphous alloy, or garnet, Pt group/iron group periodically laminated structure such as PtCo, PdCo. The reproducing layer 13 has in-plane magnetization near room temperature, and changes to perpendicular magnetization at a critical temperature Tcr or a higher temperature.

The auxiliary magnetic layer 14, which functions as a masking layer, lies additionally on the reproducing layer 13. The auxiliary magnetic layer 14 is a film having a thickness between 50 and 500 angstroms, and may be made of GdFe, GdFeCo, GdW or other rare-earth transition-metal amorphous alloy, or garnet, Pt group/iron group periodically laminated (multi-layered) structure such as or PtCo, PdCo.

The auxiliary magnetic layer 14 is an in-plane magnetic layer having a Curie temperature near the critical temperature Tcr of the reproducing layer 13. The auxiliary magnetic layer 14 defines the boundaries between masked and open areas to improve the SN ratio.

The second dielectric layer 15 lies on the auxiliary magnetic layer 14. This dielectric layer 15 is a film having a thickness between 10 and 500 angstroms, and may be made of a nitride or an oxide of Si, Al, Zr, Ti or Ta, or another inorganic dielectric. The dielectric layer 15 magneto-statically couples the reproducing layer 13 and the recording layer 16 together.

The recording layer 16 lies on the second dielectric layer 15. It is preferable that the recording layer 16 be made of a magnetic material that is great in perpendicular magnetic anisotropy and that can stably hold its magnetized state. The recording layer 16 is a film having a thickness between 100 and 2,000 angstroms, and may be made of TbFeCo, DyFeCo, TbDyFeCo or other rare-earth transition-metal amorphous alloy, or garnet, Pt group/iron group periodically laminated structure such as PtCo, PdCo.

The magnetic capping layer 17 lies on the recording layer 16. The capping layer 17 is a film having a thickness between 10 and 200 angstroms, and may be made of GdFeCo, GdFe, GdCo or other rare-earth transition-metal amorphous alloy, or garnet, Pt group/iron group periodically laminated structure such as PtCo, PdCo. The composition of the capping layer 17 should preferably be so adjusted that the perpendicular anisotropy energy and anti-field energy of the layer are equivalent to each other for easy rotation of the magnetization of the layer along an external magnetic field.

The third dielectric layer 18 lies on the magnetic capping layer 17. This dielectric layer 18 is a film having a thickness between 100 and 1,000 angstroms, and may be made of a nitride or an oxide of Si, Al, Zr, Ti or Ta, or another inorganic dielectric.

The radiating layer 19 lies on the third dielectric layer 18. The radiating layer 19 is a film having a thickness between 200 and 1,500 angstroms, and should preferably be made of Al, AlTi, Au, Ag, Cu, AuAl, AgAl or other metal, or metal alloy containing such metal. The radiating layer 19 and third dielectric layer 17 control the heat distribution formed by laser beams.

Figure 18:
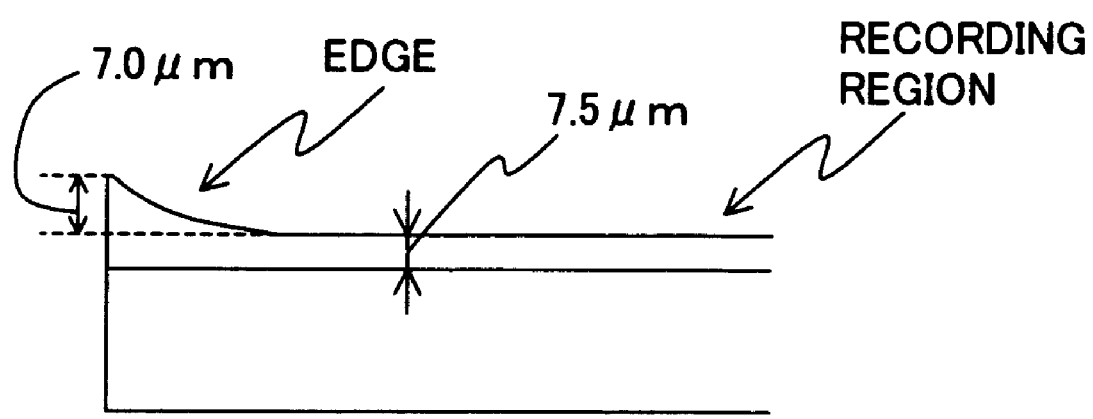
FIG. 18 is a fragmentary enlarged cross section of a peripheral portion of an optical disk.

Finally, the protective layer 20 further covers all of the layers 12 through 19 to protect them from oxidation or other chemical corrosion, and from contact with a magnetic head. The protective layer 20 may be formed by the spin coating with photo-setting resin or other organic material. As shown in FIG. 18, the protective layer 20 is so formed that the disk edge rises from the other portion of the disk. It is preferable that the edge of the protective layer 20 have a height of 15 or less microns (μm). When the optical disk is used in a cartridge, the edge height of 15 or less microns allows a flying head to enter the recording region of the disk without colliding with the disk edge. This edge height can make the radial width of the rising edge narrower than conventionally, making the recording region wider.

With reference to FIG. 3, a magnetic clamping hub 3 is made of a material that can be attracted by a magnet. The clamping hub 3 is mounted movably on a substrate 1. It is preferable that the hub 3 be made of a metallic magnetic material of Fe, Ni, Co, an alloy of them or the like, or a plastic magnet. The spindle 2 includes a disk support 2a and is fitted with a magnet 4. The magnet 4 attracts the hub 3 magnetically, and its attractive force urges the underside of the substrate 1 against the disk support 2a. X is the projected area of the urged substrate 1. Y is the contact area of those portions of the substrate 1 and hub 3 which are in mutual contact. By satisfying the relation $Y/X \geqq 0.015$, it is possible to make the frictional force between the substrate 1 and hub 3 sufficient. This prevents the substrate 2 and hub 3 from slipping on each other while they are rotating. The slippage prevention restrains the substrate 1 from rotating irregularly. In addition, the power of holding the substrate 1 is increased, and the increased power reduces its camming generated by the irregular rotation. In the case of the disk being housed in a cartridge, it is possible to reduce the turbulence caused in the cartridge while the disk is rotating.

It is preferable that the magnetic clamping hub 3 be made of a material having a coefficient of thermal conductivity of 0.05 or more cal/° C.·cm·s. This makes it possible to radiate through the hub 3 the heat from the spindle motor generating an increased amount of heat due to the irregular rotation.

Figure 17A:
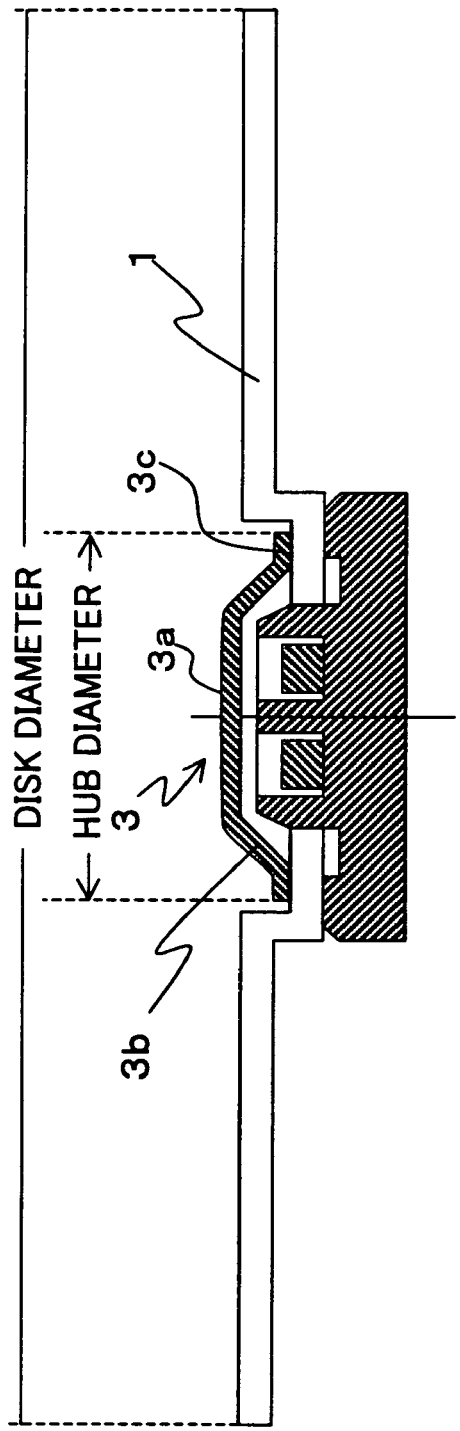
FIG. 17A is a view showing how an optical disk is mounted on a spindle.
Figure 17B:
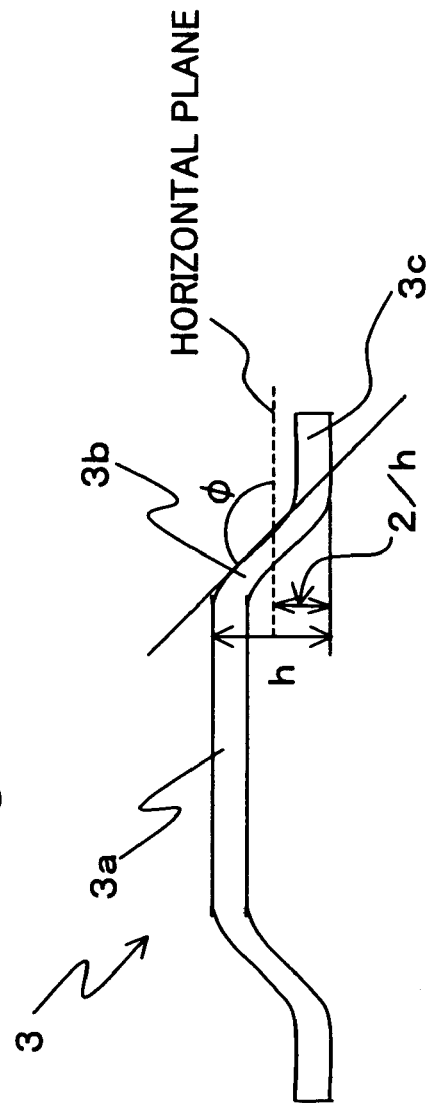
FIG. 17B is a schematic cross section showing the angle of inclination of the slope of the protruding portion of a hub.

As shown in FIG. 17A, which is a vertical section, the magnetic clamping hub 3 has a curved structure with a protruding central portion. The hub 3 includes a flange 3c, the bottom of which is supported on the substrate 1. Therefore, the area of the bottom of the flange 3c is equal to the foregoing contact area Y. The hub 3 has a central flat surface 3a, through the center of which a concentric hole might be formed. With reference to FIG. 17B, the hub 3 also has a slope 3b, which should preferably have an angle of inclination φ between 130 and 160 degrees. This range of angles makes it possible to rectify the turbulence caused by the rotation of the optical disk at high speed. The angle of inclination φ is the angle between a tangent to the slope 3b and the horizontal plane at half the height h of the hub 3. It is preferable that the outer diameter of the hub 3 (the outer diameter of the flange 3c) be 26 or more % of that of the optical disk. If the hub diameter is less than 26% of the disk diameter, the disk is apt to rotate irregularly. The irregular rotation may generate camming of the optical disk. If the optical disk is housed in a cartridge, the rotation of the disk causes turbulence in the cartridge if the hub diameter is less than 26% of the disk diameter. The turbulence may generate camming of the disk. It is more preferable that the ratio of the hub diameter to the disk diameter range from 28 to 40% in order to secure the recording region of the optical disk.

The optical disk may include one of the cartridge cases shown in FIGS. 8 through 14, and can be housed rotatably in it to form an optical disk cartridge.

Optical disk cartridges will be described below in detail with reference to the drawings.

Figure 8A:
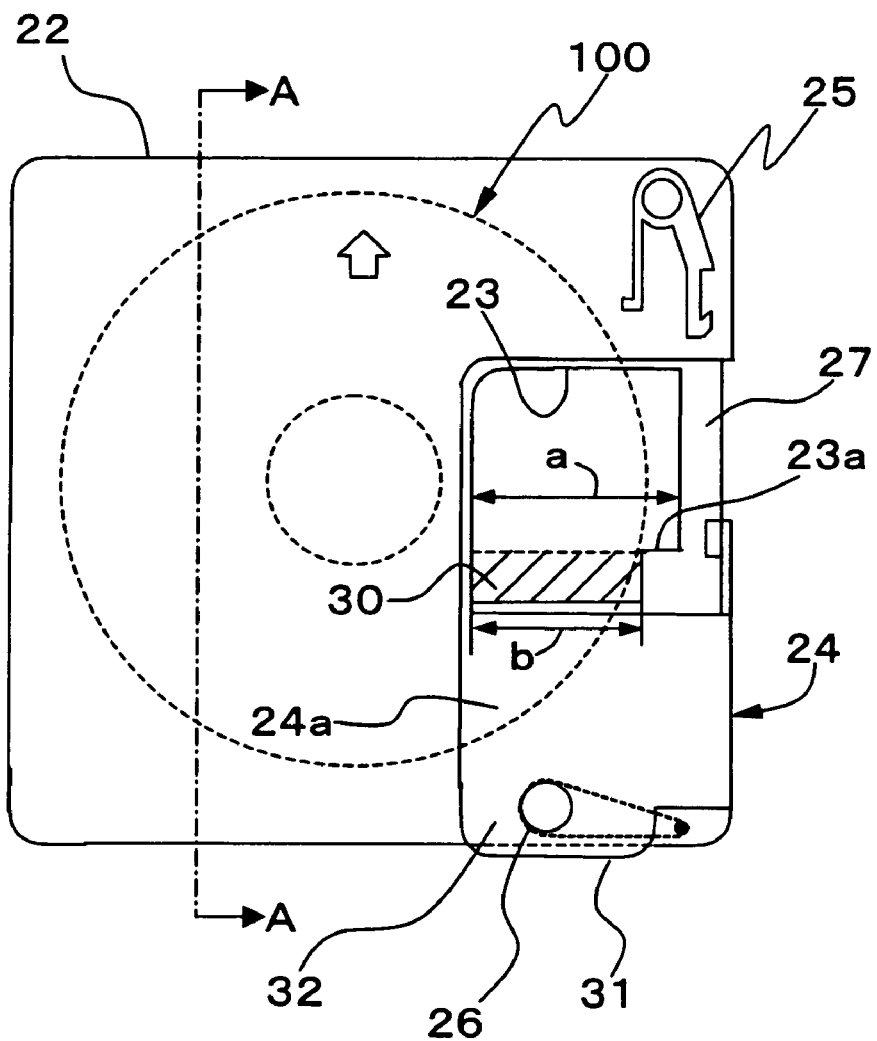
FIG. 8A is a plan view of a cartridge case, where the cartridge shutter is open.
Figure 8B:
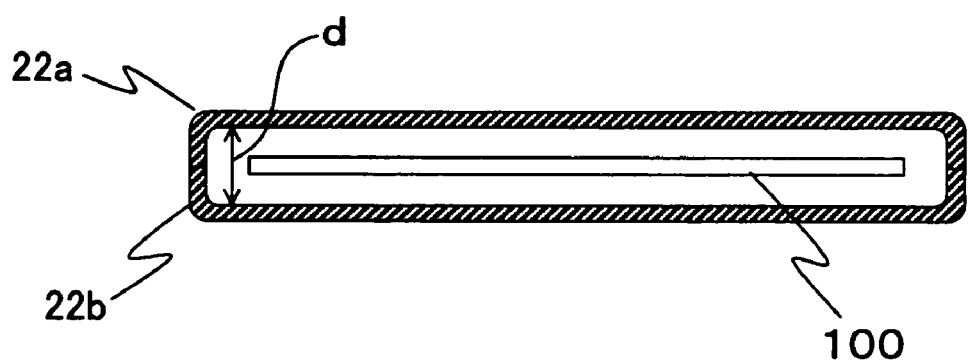
FIG. 8B is a cross section taken along line A—A of FIG. 8A.

The optical disk cartridge shown in FIGS. 8A and 8B consists of an optical disk 100 and a cartridge case 22, in which the disk is housed rotatably. Information signals can be recorded on the optical disk 100. The optical disk 100 may be that mentioned above, and includes a recording layer on one or each side, and information signals can be recorded on this layer. The optical disk 100 is fitted with a hub (not shown) in the center of its underside.

As shown in FIG. 8B, the cartridge case 22 consists of an upper half 22a and a lower half 22b, which are plastic moldings joined together. As shown in FIG. 8A, the case halves 22a and 22b are square or rectangular in their plan views, and each have a signal read/write window 23 formed therethrough. It is possible to open and close the window 23 by sliding a shutter 24. A lock pawl 25 locks the shutter 24 in the closed position. A coil spring 26 urges the shutter 24 to be closed. The cartridge case 22 may have shallow slide sinks (recesses) 27 on both sides, where the shutter 24 can slide to be opened and closed.

The signal read/write windows 23 extend toward the spring 26 so as to form openings 30. As shown with broken lines in FIG. 9, the openings 30 are cut continuously from those side edges 23a of the windows 23, which are upstream with respect to the rotation of the optical disk 100. The shutter 24 has main walls 24a, each of which may be formed integrally with a lid 31. When the shutter 24 shuts the windows 23, the lids 31 close the openings 30.

Based on the longitudinal size a (FIG. 8) of the signal read/write windows 23, the longitudinal size b of the openings 30 is set to be smaller than the size a. The sizes a and b are set on the basis of those edges of the windows 23 and openings 30 which are adjacent to the center of the cartridge case 22. Accordingly, the base edges continue in alignment with each other.

Figure 9:
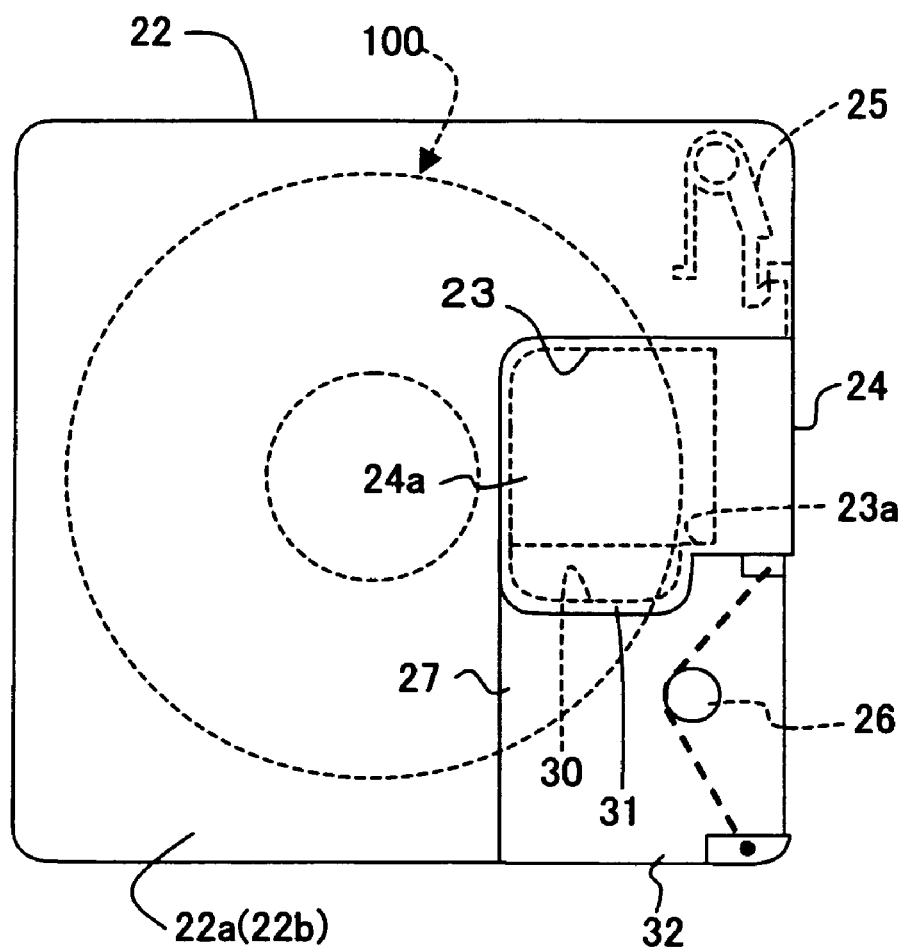
FIG. 9 is a plan view of the cartridge case, where the cartridge shutter is closed.
Figure 10:
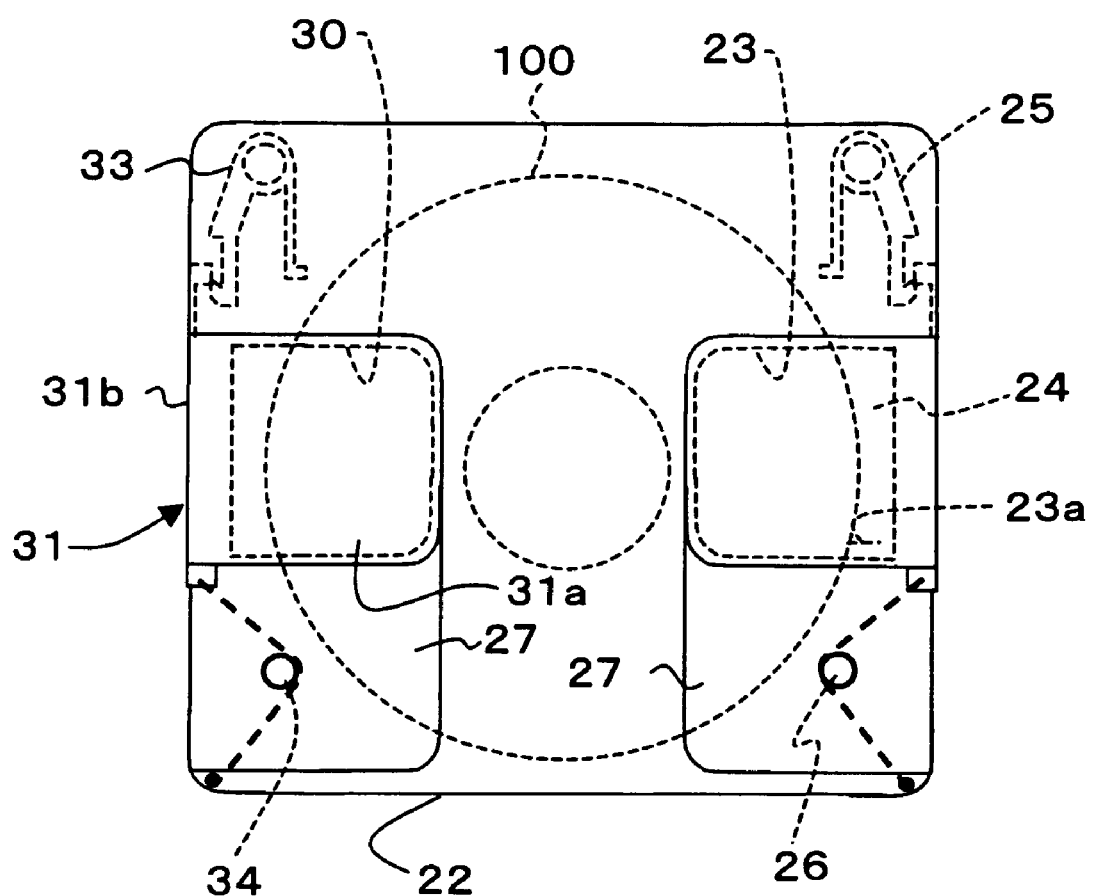
FIG. 10 is a plan view of the cartridge case, showing another cartridge.

With reference to FIG. 9, the shutter 24 can be slid until the signal read/write windows 23 are opened, and further to a position where the openings 30 are opened. In this position, the lids 31 protrude from the slide sinks 27. Therefore, the peripheral walls at the open ends of the slide sinks 27 have relief sinks (recesses) 32 flush with the sinks 27. The protrudable ends of the lids 31 can slide through the relief sinks 32 out of the cartridge case 22.

The optical disk cartridge can be inserted into a disk driving apparatus (recorder/reproducer) in the direction indicated by an arrow in FIG. 8A. When the cartridge is inserted into the disk driving apparatus, the lock pawl 25 is released, and the shutter 24 is slid against the urging force of the spring 26. The cartridge case 22 has a drive hole formed through the center of its underside. A drive shaft (not shown) extends through the drive hole, and holds the optical disk 100 through the hub. The optical disk 100 rotates clockwise in FIG. 8A. By forming the openings 30 and the lids 31, which can close these openings, it is possible to cause the flowing air created by the rotation of the optical disk 100 to escape effectively from the cartridge case 22. The lids 31 form integral parts of the shutter 24. The openings 30 decrease the air resistance at a time when the optical disk 100 is driven. This allows the optical disk 100 to rotate stably.

Thus, by providing the openings 30 in addition to the signal read/write windows 23, it is possible to cause the flowing air created by the rotation of the optical disk 100 and/or the vortex flow (eddy current) created on the disk to escape through the windows 23 and openings 30. This suppresses turbulence and decreases the air resistance at a time when the optical disk 100 is driven. It is consequently possible to stabilize the rotation of the optical disk 100 while the disk is driven.

The openings 30 and lids 31 might be independent of the signal read/write windows 23 and shutter 24, respectively. The optical disk cartridge shown in FIG. 10 includes a cartridge case consisting of an upper part and a lower part. Each of the case halves has a signal read/write window 23 at one side and an opening 30 at the other side. The cartridge case is fitted with a shutter 24 and a lid 31. The lid 31 can slide to open and close the openings 30 of the case halves. Like the shutter 24, the lid 31 includes an upper main wall 31a, a lower main wall 31c and an end wall 31b, which connects the main walls and is perpendicular to them. The lid 31 is urged by a coil spring 34 to slide to a closing position, and can be locked in this position by an exclusive lock pawl 33. The lock pawl 33 may be identical with the lock pawl 25 for the shutter 24. Like the shutter 24, the lid 31 can be opened by the insertion of the disk cartridge.

It is preferable that the inside dimension of the cartridge be 300 or more % of the thickness of the substrate. This prevents the optical disk in the cartridge from being electrified by the friction of the disk against air when the disk is rotated. The prevention of electrification keeps dust from sticking to the disk. As shown in FIG. 8B, the inside dimension of the cartridge is the distance d between the inner surfaces of the case halves 22a and 22b.

The cartridge may have protrusions or recesses on inner surfaces to adjust the air flow in it during the rotation of the disk. The adjusted air flow urges the signal recording surface of the disk to a constant height so as to stabilize the disk rotation during the recording on and the reproduction from the disk. Cartridges having protrusions or recesses on inner surfaces will be described below.

Figure 11A:
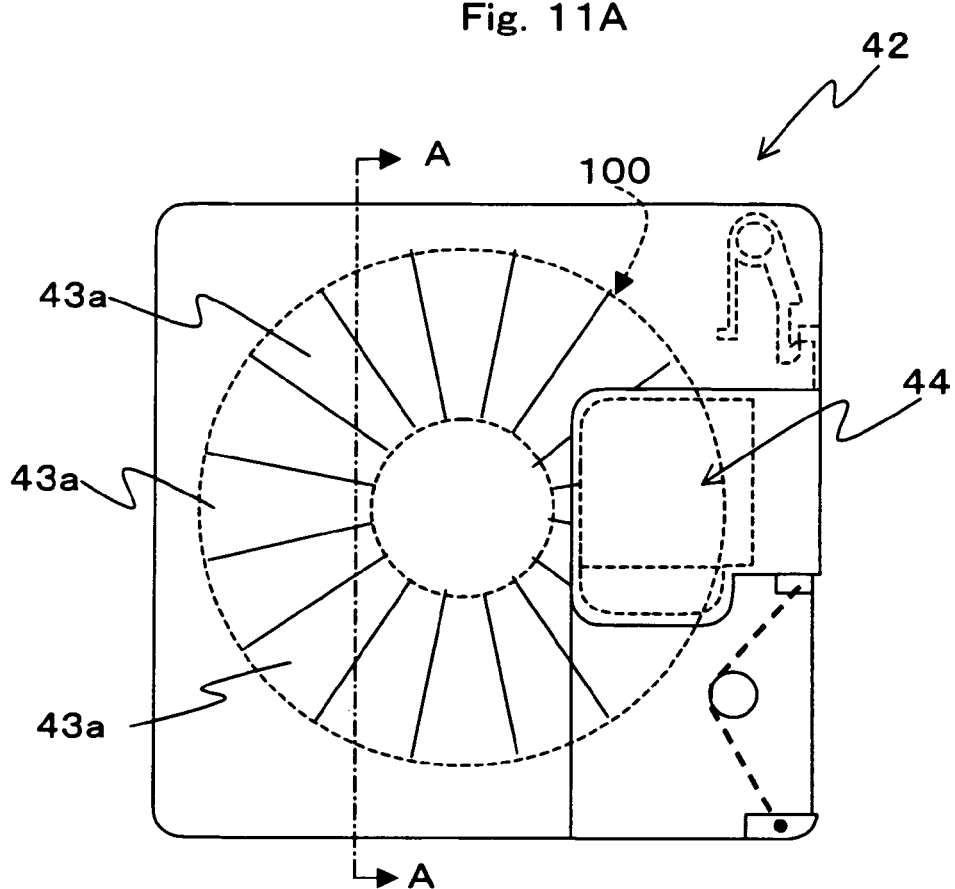
FIG. 11A is a plan view of a cartridge case, showing the structure of a cartridge, where ridges are formed radially on the inside of the case.
Figure 11B:
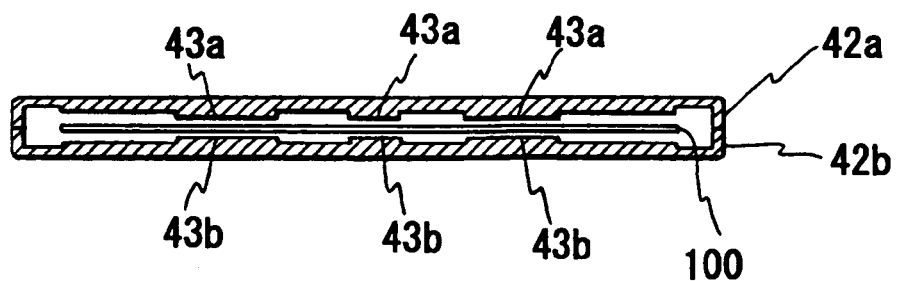
FIG. 11B is a cross section taken along line A—A of FIG. 11A.

FIG. 11A is a plan view of a cartridge case 42 housing an optical disk 100. The cartridge case 42 has ridges 43a formed on its inside and extending radially away from the center of the optical disk 100. For convenience of explanation, in FIG. 11A, the cartridge case 42 is seen through in order for the shape of the optical disk 100 and the ridges 43a to be shown. FIG. 11B is a cross section of the cartridge case 42 taken on line A—A of FIG. 11A. The cartridge case 42 consists of an upper half 42a and a lower half 42b. FIG. 11A is a plan view as seen from above the upper case half 42a. The upper case half 42a has a signal read/write window 44 formed through it, through which an optical head can have access to the optical disk 100 during the recording on and the reproduction from the disk (no shutter is shown). The optical disk 100 is housed in the cartridge case 42.

As shown in FIGS. 11A and 11B, the halves 42a and 42b of the cartridge case 42 have beltlike ridges 43a and 43b formed on their respective inner sides. The ridges 43a and 43b extend radially away from the center of the optical disk 100 and are symmetric with respect to the disk. The ridges 43a and 43b may fan out and have a desired thickness (height from the inner sides of the case halves 42a and 42b). The distances between the upper side of the disk 100 and the ridges 43a and between the lower side of the disk and the ridge 43b should range preferably from 50 to 300%, and more preferably from 50 to 150%, of the thickness of the substrate of the disk. The ridges 43a and 43b may widen at an angle between 5 and 90 degrees from the disk center and extend over and under the disk. The ridges 43a and 43b may extend from the edge of the central opening (for a hub) of the disk 100 to a desired position.

While the optical disk 100 is rotating, the ridges 43a and 43b on the inside of the cartridge radially guide the air flow created circumferentially of the disk. This increases the pressure at a peripheral portion of the disk 100. By applying the increased pressure equally on both sides of the disk 100, it is possible to stabilize the surface position and the rotation of the peripheral portion of the disk, which fluctuate particularly greatly.

FIG. 12A and FIG. 12B, which is a cross section on line A—A of FIG. 12A, show a modification of the cartridge shown in FIGS. 11A and 11B. Like the cartridge case 42, the cartridge case 52 shown in FIGS. 12A and 12B consists of an upper half 52a and a lower half 52b, and houses a disk 100. The case halves 52a and 52b have ridges 53a and 53b formed on their respective inner sides. The ridges 53a and 53b extend radially away from the center of the disk in such a manner that they describe arcs 55 in the direction of rotation of the disk. The arcs 55, which define the ridges 53a and 53b, may have a desired radius and may each have a center on the circumference of the disk. The disk circumference may be divided into 16 parts, on each of which the center of one of the arcs 55 may be positioned. This results in 16 arcs being formed in total. As shown in FIG. 12B, the ridges 53a and 53b take the form of saw teeth in cross section. The ridges 53a and 53b protrude at the arcs 55, where the space between the inner side of each case half 52a or 52b and the adjacent surface of the disk 100 is minimum. This space widens gradually toward the next arc 55. In other words, there are differences in level between adjacent ridges at the arcs 55, which define the boundaries between the ridges 53. It is preferable that the distance between each ridge 53a or 53b and the adjacent surface of the disk 100 at the associated arc 55 range from 50 to 300% of the substrate thickness. The ridges 53a and 53b are formed on the inside of the cartridge case 52 symmetrically with respect to the disk 100. The ridges 53a and 53b radially guide the air flow created circumferentially of the disk 100 by the rotation of the disk. This increases the pressure at a peripheral portion of the disk 100. By applying the increased pressure equally on both sides of the disk 100, it is possible to stabilize the surface position and the rotation of the peripheral portion of the disk, which fluctuate greatly.

Figure 13A:
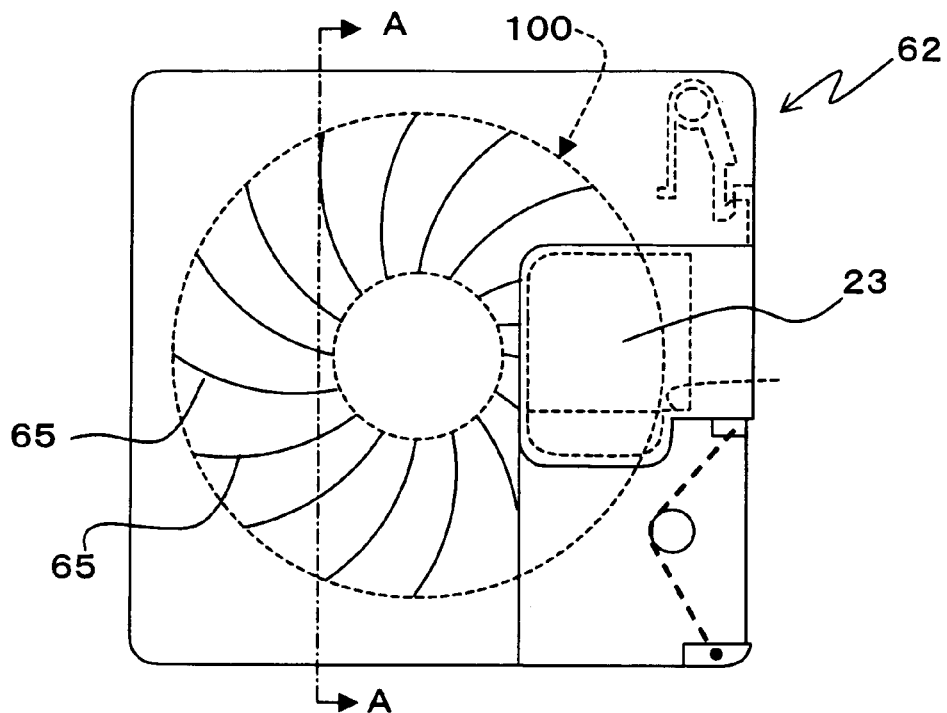
FIG. 13A is a plan view of a cartridge case, showing the structure of a cartridge.
Figure 13B:
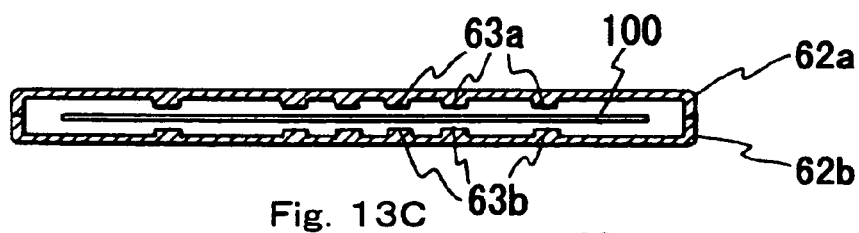
FIGS. 13B through 13D are cross sections taken along line A—A of FIG. 13A, showing sectional structures of various ridges.

FIG. 13A and FIG. 13B, which is a cross section on line A—A of FIG. 13A, show a modification of the cartridge case shown in FIGS. 12A and 12B. The cartridge case 62 shown in FIGS. 13A and 13B consists of an upper half 62a and a lower half 62b. Like the case halves 52a and 52b shown in FIGS. 12A and 12B, the case halves 62a and 62b have ridges 63a and 63b formed on their respective inner sides. The ridges 63a and 63b may extend radially away from the center of the disk 100 in such a manner that they describe arcs 65 in the direction of rotation of the disk. The ridges 63a and 63b are symmetric in sectional shape with respect to the disk 100. As shown in FIG. 13B, the ridges 63a and 63b extend only along the arcs 65.

Figure 13C:
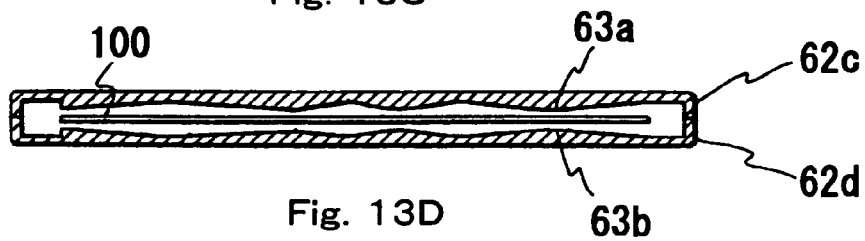
Figure 13D:
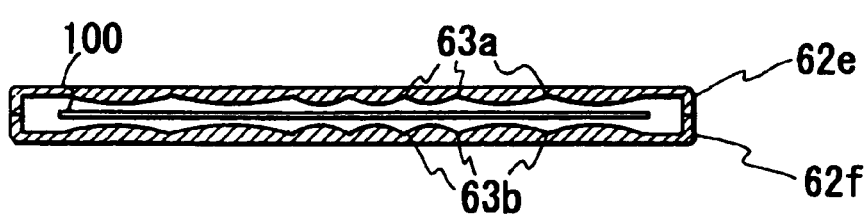

FIGS. 13C and 13D show other cartridges in cross section, each of which includes a cartridge case consisting of an upper half and a lower half. Like the case halves 62a and 62b shown in FIGS. 13A and 13B, the case halves shown in FIGS. 13C and 13D have ridges formed on their inner sides. The ridges extend radially away from the center of the disk in such a manner that they describe arcs in the direction of rotation of the disk. The arcs are described in such a manner that the ridges (or grooves) defined by the arcs differ in sectional shape. In FIG. 13C, a peripheral portion of the disk is divided into 16 parts, at each of which the center of one of the arcs 65 on the case halves 62c and 62d is set. The ridges 63a and 63b may be formed in such a manner that the arc of which the center is set at every second one of the 16 parts extends at the highest level while the other eight arcs extend at the lowest level. In FIG. 13D, in contrast to FIG. 13B, the case halves 62e and 62f have grooves 63a and 63b, respectively, formed along the arcs 65 on the inner sides of the halves. The distance between each side of the disk and the adjacent ridge on the inside of the cartridge should range preferably from 50 to 300%, and more preferably from 50 to 150%, of the thickness of the substrate of the disk.

The ridges or grooves formed on the inside of the cartridge, as shown in FIGS. 13A through 13D, radially guide the air flow created circumferentially of the disk 100 by the rotation of the disk. This increases the pressure at a peripheral portion of the disk 100. By applying the increased pressure equally on both sides of the disk 100, it is possible to stabilize the surface position and the rotation of the peripheral portion of the disk, which fluctuate particularly greatly.

Figure 15A:
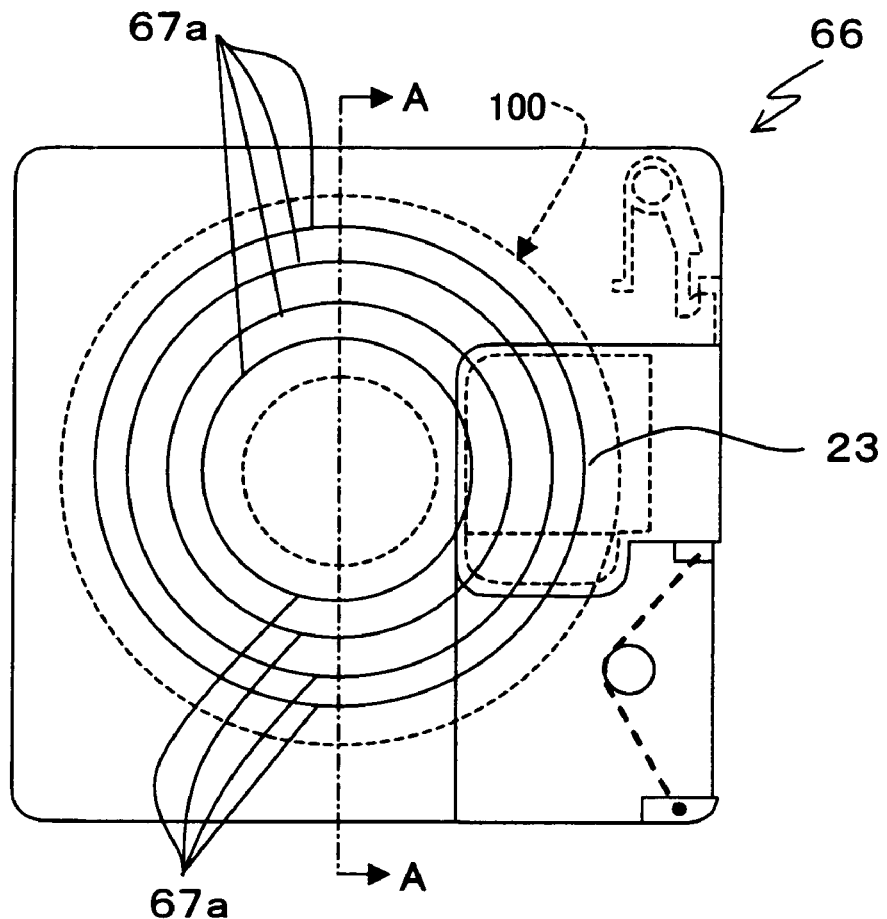
FIG. 15A is a plan view of a cartridge case, showing the structure of a cartridge, where ridges are formed concentrically on the inside of the case.
Figure 15B:
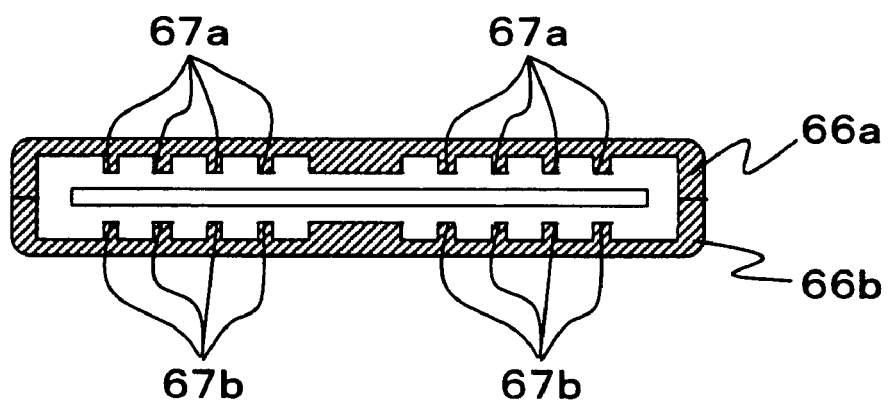
FIG. 15B is a cross section taken along line A—A of FIG. 15A.

FIG. 15A and FIG. 15B, which is a cross section on line A—A of FIG. 15A, show another modification of the cartridge cases shown in FIGS. 11 through 13. The cartridge case 66 shown in FIGS. 15A and 15B consists of an upper half 66a and a lower half 66b, which have circular ridges 67a and 67b formed on their respective inner sides. The circular ridges 67a and 67b are concentric with the disk 100. The upper ridges 67a are spaced at predetermined intervals and may differ in height from each other. The lower ridges 67b are spaced at predetermined intervals and may differ in height from each other. The ridges 67a and 67b may be symmetric in sectional shape with respect to the disk 100.

Figure 14A:
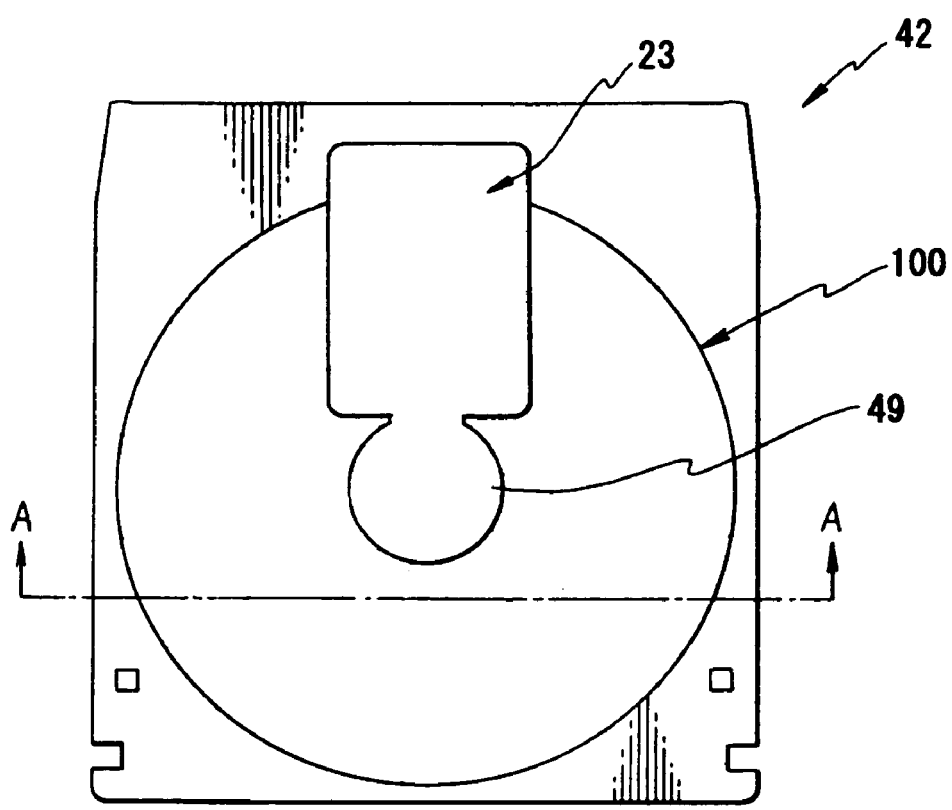
FIG. 14A is a plan view of a cartridge case, showing the structure of a cartridge, where no ridges are formed on the inside of the case.
Figure 14B:
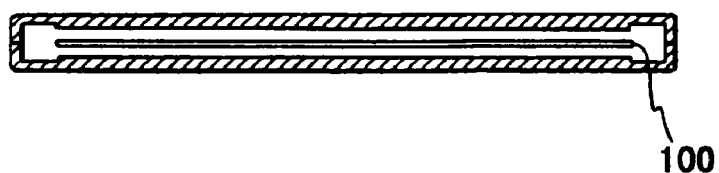
FIG. 14B is a cross section taken along line A—A of FIG. 14A.

FIG. 14A is a plan view. FIG. 14B is a cross section on line A—A of FIG. 14A. FIGS. 14A and 14B show a cartridge case 42 having no ridges for adjusting air flow while an optical disk 100 is rotating. The cartridge case 42 has a signal read/write window 23, through which a head can have access to the optical disk 100. The cartridge case 42 also has a spindle opening 49, through which a spindle can be chucked to the optical disk 100. The cartridge case 42 can form part of a disk cartridge by housing an optical disk according to the present invention.

Figure 16:
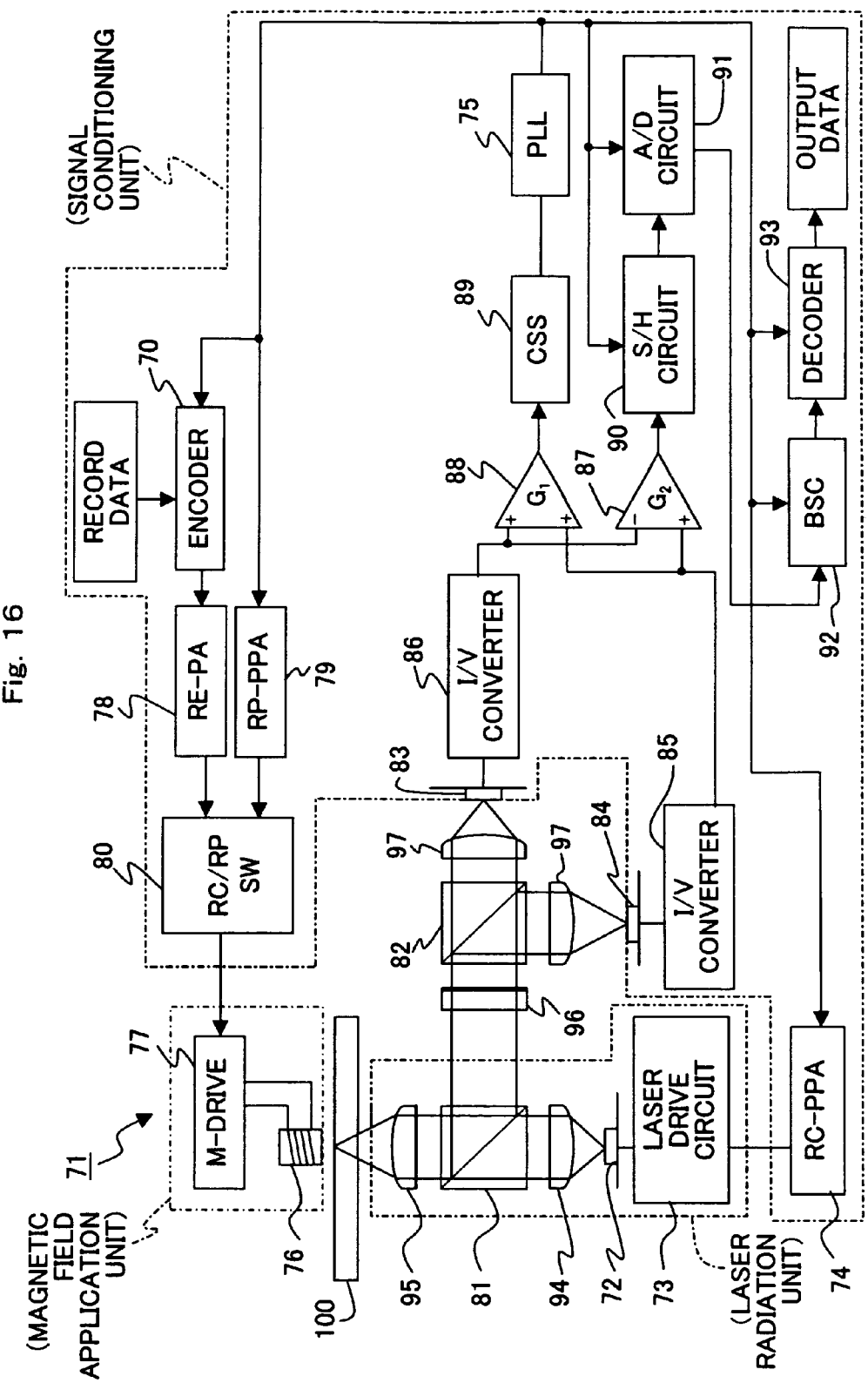
FIG. 16 is a schematic diagram of an apparatus for recordation on and reproduction from an optical disk.

FIG. 16 shows the structure of a recording and reproducing apparatus 71 for recording information on and reproducing information from a magneto-optical disk 100. The apparatus 71 consists mainly of a laser radiation unit, a magnetic field application unit and a signal conditioning unit. The laser radiation unit irradiates the disk 100 with light pulsed at a constant period in synchronism with code data. The field application unit applies controlled magnetic fields to the disk 100 during the recordation and reproduction. The signal conditioning unit detects and processes the signals from the disk 100. The laser radiation unit includes a laser 72, which is connected to a laser drive circuit 73 and a recording pulse width/phase adjustment circuit (RC-PPA) 74. In receipt of a signal from the adjustment circuit 74, the drive circuit 73 controls the laser pulse width and phase of the laser 72. A PLL circuit 75 generates a clock signal, which will be mentioned later on. In receipt of the clock signal, the adjustment circuit 74 generates a first synchronizing signal for adjusting the phase and pulse width of recording light.

The magnetic field application unit includes a magnetic coil 76 for applying magnetic fields. The magnetic coil 76 is connected to a magnetic coil drive circuit (M-DRIVE) 77. During the recordation, the coil drive circuit 77 controls the magnetic coil 76 by receiving input data via a phase adjustment circuit (RE-PA) 78 from an encoder 70, to which data is input. During the reproduction, in receipt of the clock signal from the PLL circuit 75, the coil drive circuit 77 generates a second synchronizing signal for adjustment of phase and pulse width via a reproducing pulse width/phase adjustment circuit (RP-PPA) 79, and controls the magnetic coil 76 on the basis of this synchronizing signal. In order to switch the signal input to the coil drive circuit 77 between the recordation and reproduction, a recording/reproducing switch (RC/RPSW) 80 is connected to this drive circuit 77.

The signal conditioning system includes a first polarizing prism 81, a second polarizing prism 82, and detectors 83 and 84. The polarizing prism 81 is interposed between the laser 72 and magneto-optical disk 100. The polarizing prism 82 and detectors 83 and 84 are positioned on one side of the polarizing prism 81. The detectors 83 and 84 are connected via I/V converters 85 and 86, respectively, to a subtractor 87 and an adder 88. The adder 88 is connected via a clock sampling circuit (SCC) 89 to the PLL circuit 75. The subtractor 87 is connected via a sample-and-hold circuit (S/H) circuit 90 for holding a signal in synchronism with the clock, an A/D conversion circuit 91 for analog-digital conversion in synchronism with the clock and a binary-coded signal conditioning circuit (BSC) 92 to a decoder 93.

The light radiated from the laser 72 is converted into parallel rays by a collimator lens 94. The parallel rays pass through the polarizing prism 81 and are condensed by an objective lens 95 onto the magneto-optical disk 100. The light reflected by the disk 100 is directed by the polarizing prism 81 toward the polarizing prism 82, passes through a half-wavelength plate 96 and is divided by the polarizing prism 82 into two beams in different directions. The beams are condensed, each by a detecting lens 97, onto the respective photodetectors 83 and 84. The disk 100 may have pits formed in advance for generating tracking error signals and the clock signal. The detectors 83 and 84 detect a signal representing the light reflected by the pits for generating the clock signal. The detected signal is sampled by the clock sampling circuit 89. Next, a data channel clock is generated by the PLL circuit 75, which is connected to the sampling circuit 89.

In the process of recording data, the laser 72 radiates a series of narrow pulsed beams modulated with a constant frequency for synchronism with the data channel clock by the laser drive circuit 73. The radiation heats the data recording area of the rotating magneto-optical disk 100 locally at regular intervals. The data channel clock controls the encoder 70 of the field application unit to generate a data signal at a reference clock period. The data signal is sent via the phase adjustment circuit 78 to the magnetic coil drive 77. The coil drive 77 controls the magnetic coil 76 to apply, to the heated spots of the data recording area of the disk 100, magnetic fields polarized in accordance with the data signal.

The optical-pulse magnetic-field modulation system is used as the recording system. This system involves radiating pulsed ! laser beams when the applied recording magnetic fields have become sufficient in strength. This makes it possible to omit recording in the regions where the external magnetic fields change over. As a result, it is possible to record minute magnetic domains with low noises. Using laser spots that are about 1 micron (μm), this system makes it possible to stably record crescent magnetic domains that are even 0.2 or less micron. It is not possible to record such domains on the optical modulation recording system.

The CAD (center aperture detection) type magnetic super-resolution reproducing system is used as the reproducing system. This system involves utilizing the distribution of temperature in a laser beam spot, and transferring the magnetic domains of the recording layer to only a central portion of the reproducing layer, which has a high temperature, so that the resolution can be improved.

Examples of the optical disk according to the first aspect of the invention will be described below in more detail.

WORKING EXAMPLE 1

A magneto-optical disk was produced which was similar in laminated structure to the disk 100 shown in FIG. 6. The disk 100 is a magneto-optical disk on the CAD system. The disk 100 is produced by the vacuum-spattering method, which includes the steps of forming on a transparent substrate 11 a first dielectric layer 12, a reproducing layer 13, an auxiliary magnetic layer 14, a second dielectric layer 15, a recording layer 16, a magnetic capping layer 17, a third dielectric layer 18 and a radiating layer 19 in order, and spin-coating a protective layer 20 on the top. The method for producing the disk 100 will be explained below in detail.

A substrate 11 was formed out of polycarbonate resin, which was injected and filled by the injection molding method. The substrate 11 was shaped as shown in FIG. 4A. In FIG. 4A, which is a cross section, as stated earlier on, the positions of the inner region 5a and outer region 6a and the difference in thickness between each of these regions and the recording and reproducing region 7a are exaggerated for clarification. In FIG. 4A, the slopes between the regions had an angle of inclination of 20 degrees. The formed substrate 11 had an outer diameter of 122 mm and an inner diameter of 15 mm, and its recording area had a thickness of 0.7 mm. The substrate 11 was a land-groove type substrate. One side of the substrate had spiral guide grooves formed at a pitch of 1.2 microns to guide laser beams to target positions on the disk. The substrate 11 had a heat conductivity of $4.6 \times 10^{-4}$ (cal/° C.·cm·s). The tensile strength in the measuring method ASTM D638 was 600 kgf/cm². The Izod strength in the measuring method ASTM D256 was 6 kgf·cm/cm. The substrate 11 had a weight of 96.7 g, and its projected area X was 115.13 cm².

Next, with the substrate 11 mounted on a spattering apparatus, a thin film of SiN having a thickness of 60 nm was formed as a first dielectric layer 12 on the substrate. This dielectric layer 12 is provided in order for beams of light to make multiple interference between the recording layer 16 and substrate 11 so that the Kerr angle of rotation can substantially increase.

Next, a reproducing layer 13 having a thickness of 30 nm was formed on the first dielectric layer 12. The reproducing layer 13 was formed out of rare-earth transition-metal amorphous film GdFeCo having in-plane magnetization at room temperature. The formation of the reproducing layer 13 involved co-spattering targets of Gd and $Fe_{80}CO_{20}$ alloy. During the spattering, the ratios between the electric powers for the targets were controlled to so adjust the composition that the critical temperature Tcr at which the direction of easy magnetization changes from an in-plane direction to a perpendicular direction is about 150 degrees, and that both the compensation temperature and the Curie temperature are 300° C. or higher. Consequently, the magnetization of the reproducing layer 13 is in-plane around room temperature and becomes perpendicular at the critical temperature Tcr or a higher temperature.

Next, an auxiliary magnetic layer 14 functioning as a masking layer was formed on the reproducing layer 13. The auxiliary magnetic layer 14 was formed out of rare-earth transition-metal amorphous film GdFe having in-plane magnetization at room temperature. The film thickness was 15 nm. The formation of the auxiliary magnetic layer 14 involved co-spattering targets of Gd and Fe, and so adjusting the composition that the Curie temperature is about 150 degrees. The auxiliary magnetic layer 14 serves to improve the reproducing resolution by sharpening (steepening) the change of the direction of the magnetization of the reproducing layer 13 from the in-plane direction to the perpendicular direction with respect to the temperature gradient formed by reproducing laser beams.

A second dielectric layer 15 was formed on the auxiliary magnetic layer 14. This dielectric layer 15 was formed out of SiN and had a thickness of 5 nm. The dielectric layer 15 is a layer for magnetostatically coupling the reproducing layer 13 and recording layer 16 together.

A recording layer 16 was formed on the second dielectric layer 15. The recording layer 16 was formed out of rare-earth transition-metal amorphous film TbFeCo having perpendicular magnetization. The film thickness was 50 nm. The formation of the recording layer 16 involved co-spattering targets of Tb and $Fe_{90}CO_{10}$ alloy, and controlling the ratios between the electric powers for the targets to so adjust the composition that the compensation temperature is about 75° C. and that the Curie temperature is about 250° C.

Next, a magnetic capping layer 17 was formed on the recording layer 16. The capping layer 17 was formed out of rare-earth transition-metal amorphous film GdFeCo having in-plane magnetization at room temperature. The film thickness was 5 nm. The formation of the capping layer 17 involved co-spattering targets of Gd and $Fe_{80}CO_{20}$ alloy, and controlling the ratios between the electric powers for the targets to so adjust the composition that the Curie temperature is 300° C. or higher. The magnetic characteristic of the capping layer 17 was so adjusted that the perpendicular anisotropy energy and the counter-field energy are equivalent to each other for easy rotation of magnetization along an external magnetic field.

Next, a third dielectric layer 18 was formed on the magnetic capping layer 17. This dielectric layer 18 was formed out of SiN and had a film thickness of 20 nm.

Next, a radiating layer 19 was formed on the third dielectric layer 18. The radiating layer 19 was formed out of $Al_{97}Ti_3$ and had a film thickness of 40 nm. Like the dielectric layer 18, the radiating layer 19 serves to control the heat distribution effected by laser beams.

Finally, a protective layer 20 was formed to protect all of the layers 12 through 19 from oxidation or other chemical corrosion and the contact with a magnetic head. The formation of the protective layer 20 involved spin coating with acrylic ultraviolet-curing resin (UV resin), and curing it with an ultraviolet exposure apparatus. The spin coating included the step of dropping the UV resin at a radial position R=13.4 mm (discharge time=0.8 second) while rotating the substrate at a speed of 95 rpm, the step of subsequently rotating the substrate for 3 seconds, the step of subsequently rotating the it at a higher speed of 5,000 rpm for 1 second, and the step of finally rotating it at an even higher speed of 6,000 rpm for 1 second. The spin coating under these conditions produces a protective layer, as shown in FIG. 18, which has a thickness of 7.5 microns at the recording region of the disk and a height of 7.0 microns at the edge of the disk.

The hub 3 is a magnetic clamping hub made of a material that can be attracted by a magnet. As shown in FIGS. 17A and 17B, the hub 3 has a convex central portion, and consists of a central flat portion 3a, a flange 3c, and an inclined portion 3b between the portions 3a and 3c. In FIG. 17B, the angle of inclination φ between the inclined portion 3b and flat portion 3a is about 145 degrees. The hub 3 had an outer diameter of 31.72 mm (26% of the disk diameter). As shown in FIG. 17A, the hub 3 is mounted movably on the substrate 1. The hub 3 was made of SUS430. The contact area Y between the substrate 1 and hub 3 is 1.725 cm² (Y/X=0.015).

The ratio of Y/X=0.015 made it possible to secure frictional force between the substrate and the hub, preventing them from slipping on each other while rotating. This restrained the substrate from irregularly rotating. In addition, this increased the substrate holding force against the substrate surface vibration generated by the irregular rotation and/or the turbulence caused in the cartridge by the rotation of the substrate. Consequently, the influence of the vibration and turbulence was decreased.

Figure 7:
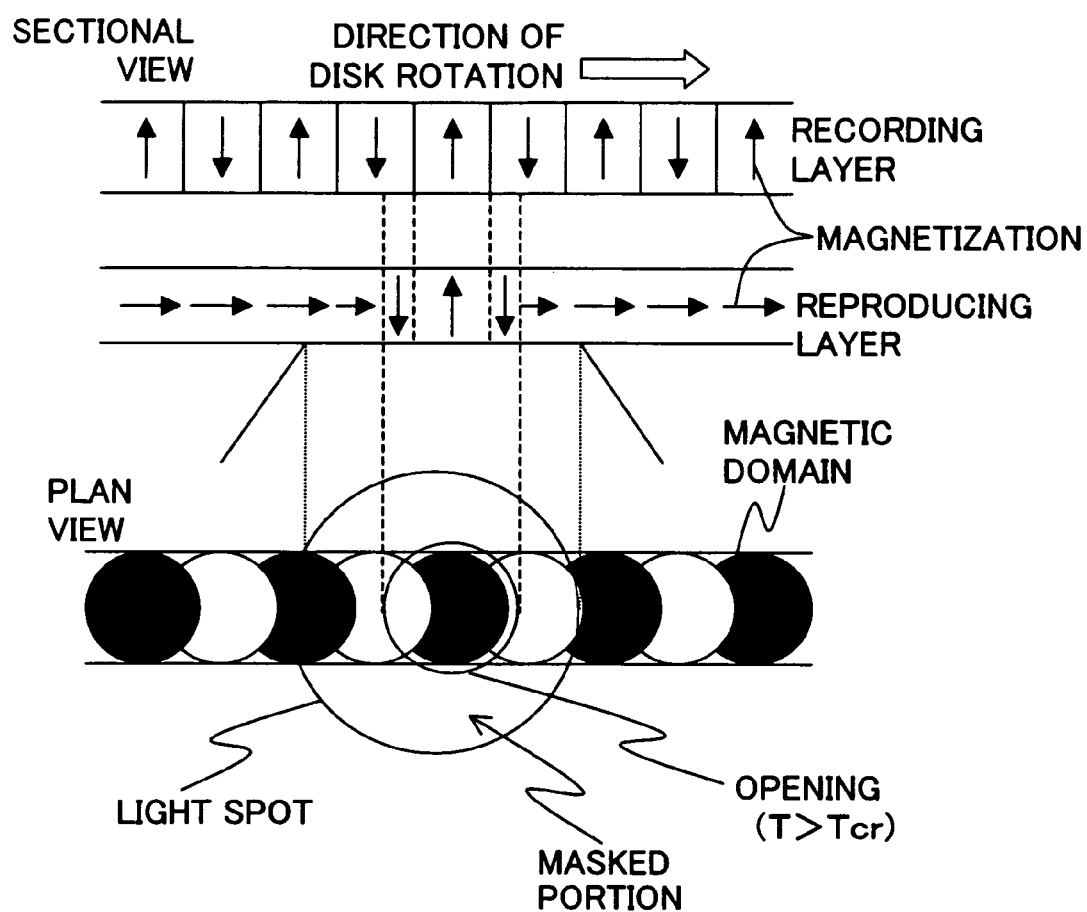
FIG. 7 is a conceptual view showing CAD type magnetic super-resolution reproduction.

This magneto-optical disk is a CAD type magneto-optical record medium for magnetic super resolution. When the disk is irradiated with a laser beam in a process of reproducing information, as shown in FIG. 7, a beam spot is formed on the disk. A central portion of the beam spot is heated to the temperature Tcr or a higher temperature. This directs the magnetization of the heated region of the reproducing layer 13 perpendicularly. The perpendicular directions of magnetization of the heated region coincide with the directions of magnetization of the record domains of the recording layer 16 that are positioned just under the heated region. The reproducing layer 13 has in-plane magnetization in the region outside the constant-temperature line of Tcr. The outside region functions as a mask, onto which no record domains of the recording layer 16 are transferred. An opening, or magnetization is transferred onto the region inside the constant-temperature line of Tcr of the reproducing layer. Consequently, even if there are two or more magnetic domains in the beam spot, it is possible to extract and reproduce only the desired domain at the reproducing layer. This improves the reproducing resolution.

Next, the magneto-optical disk 100 was housed in a cartridge case as shown in FIG. 12, so that a magneto-optical disk cartridge was produced.

The cartridge case 52 consists of an upper half 52*a* and a lower half 52*b*, and houses the magneto-optical disk 100. The case halves 52*a* and 52*b* have ridges 53*a* and 53*b* formed on their respective inner sides. The ridges 53*a* and 53*b* extend radially away from the center of the disk in such a manner that they describe arcs 55 in the direction of rotation of the disk. The arcs 55, which define the ridges 53*a* and 53*b*, have centers on the circumference (122 mm in diameter) of the disk and a radium of 61 mm. The disk circumference was divided into 16 parts, on each of which the center of one of the arcs 55 was positioned. This results in 16 arcs being formed in total. As shown in FIG. 12B, the ridges 53*a* and 53*b* take the form of saw teeth in cross section. The ridges 53*a* and 53*b* protrude at the arcs 55, where the space between the inner side of each case half 52*a* or 52*b* and the adjacent surface of the disk 100 is minimum. This space widens gradually toward the next arc 55. In other words, there are differences in level between adjacent ridges at the arcs 55, which define the boundaries between the ridges 53. The ridges 53 have a height of 0.5 mm. The distance between each ridge 53*a* or 53*b* and the adjacent surface of the disk 100 at the associated arc 55 is 0.5 mm. The ridges 53*a* and 53*b* are formed on the inside of the cartridge case 52 symmetrically with respect to the disk 100. The symmetric ridges 53*a* and 53*b* radially guide the air flow created circumferentially of the disk 100 by the rotation of the disk. This increases the pressure at a peripheral portion of the disk 100. By applying the increased pressure equally on both sides of the disk 100, it was possible to stabilize the surface position and the rotation of the peripheral portion of the disk, which fluctuate greatly. The ridges and the valleys formed between them defined air passages, which made it possible to restrain turbulence from being caused by the rotation of the disk.

Next, this magneto-optical disk cartridge was set in the recording and reproducing apparatus 71 shown earlier on. The magneto-optical disk was then rotated at speeds between 360 rpm and 7,200 rpm. The rotational stability of the rotating disk and the occurrence of tracking errors and write/read errors were examined. The results of the examination will be shown below in Table 1. At 720 rpm or a higher rotational speed, the vibration of the spindle motor itself, the heat generation from this motor, the air flow created by the disk rotation, and the substrate deformation caused by the torque increase as the speed rises. Consequently, these affect the rotational stability of the disk, the recordation on it and the reproduction from it. However, the magneto-optical disk of Working Example 1 was able to maintain stable rotational speeds within the whole range of rotation, and had no tracking error and no write/read error.

TABLE 1

| Rotational Speed (rpm) | Working Example 1 | Working Example 2 | Comparative Example 1 |
|---|---|---|---|
| 360 | A | A | A |
| 720 | A | A | C |
| 1,080 | A | A | C |
| 1,440 | A | A | C |
| 1,800 | A | A | C |
| 2,400 | B | A | C |
| 3,000 | B | A | D |
| 3,600 | B | A | D |
| 4,000 | B | A | D |
| 4,800 | B | A | D |
| 5,400 | B | A | D |
| 7,200 | B | A | D |

In Table 1, the evaluations A through D mean as follows.

A: The variation in rotational speed was within a range of ±1% (no tracking error and no write/read error occurred).

B: The variation in rotational speed was within a range of ±3% (no tracking error and no write/read error occurred).

C: The variation in rotational speed was within a range of ±5% (a tracking error and a write/read error occurred).

D: The variation in rotational speed was within a range of ±7% (a tracking error and a write/read error occurred).

WORKING EXAMPLE 2

A magneto-optical disk was produced like Working Example 1 except that the contact area Y between the substrate and the magnetic clamping hub was changed to 2.30 cm$^2$ (Y/X=0.020). The magneto-optical disk was housed in the same cartridge as was used for Working Example 1. The cartridge was then set in the recording and reproducing apparatus 71. The magneto-optical disk was then rotated at speeds between 0 rpm and 7,200 rpm. The rotational stability of the rotating disk and the occurrence of tracking errors and read errors were examined. The results of the examination are shown above in Table 1. As evident from the table, this magneto-optical disk was able to maintain stable rotational speeds within the whole range of rotation. No tracking error and no write/read error occurred. The magneto-optical disk is very suitable as a magneto-optical disk that can rotate within a range of rotation at high speed.

COMPARATIVE EXAMPLE 1

A magneto-optical disk was produced like Working Example 1 except that the contact area Y between the substrate and the magnetic clamping hub was changed to 1.495 cm$^2$ (Y/X=0.013; the hub diameter is 24% of the disk diameter). The magneto-optical disk was set in the same recording and reproducing apparatus 71 as was used for Working Example 1. The magneto-optical disk was then rotated at speeds between 0 rpm and 7,200 rpm. The rotational stability of the rotating disk and the occurrence of tracking errors and read errors were examined. The results of the examination are shown above in Table 1. Within a range of rotational speed higher than 720 rpm, as evident from the table, the rotation was unstable, and it was not able to keep the rotational speed constant. A tracking error and a read error occurred.

A record disk including a substrate embodying the third aspect of the invention and a driving apparatus for the disk will be described below in detail.

First Embodiment

Figure 19:
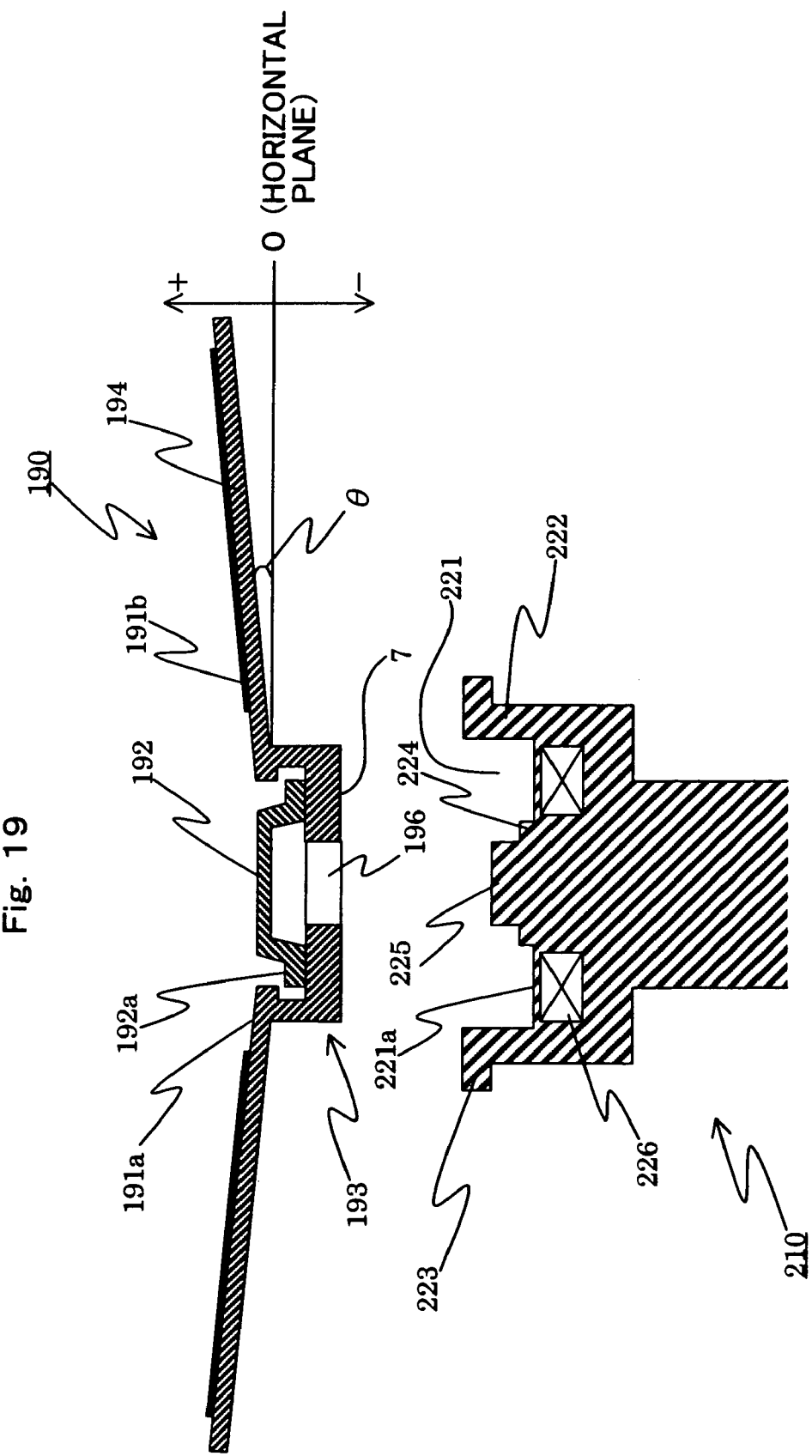
FIG. 19 is a view typically showing a record disk having a substrate according to the fourth aspect of the present invention and the disk driving apparatus shaft of a driving apparatus according to the fifth aspect of the invention.

FIG. 19 schematically shows an optical record disk 190 including a substrate according to the third aspect of the invention and a mechanism for rotating the disk. The optical record disk 190 has a recording surface 191b in a predetermined region of an upper surface 191a of the substrate 191. The recording surface 191b can be irradiated with recording light or reproducing light so that information can be recorded or reproduced, respectively. The recording light or the reproducing light is incident on the underside of the optical record disk 190 in FIG. 19. The substrate 191 consists of a magnetic hub 192, a cylindrical hub holder 193 and a main body 194. The hub 192 is made of SUS material and put movably in the holder 193. The main body 194 extends radially outward from the top of the peripheral wall of the holder 193.

The substrate 191 takes the form of a disk, which has a diameter of 50 mm, and can be produced by injection molding. In FIG. 19, $\theta$ represents the angle of inclination of the upper surface (or the surface on which light is incident) of the substrate with respect to the bottom 193a of the hub holder. This angle of inclination is the angle between a horizontal plane and the main body of the substrate. In FIG. 19, plus and minus tilts are defined as the upward inclination and the downward inclination, respectively. In FIG. 19, the optical axis of recording light or reproducing light is set perpendicularly (vertically). In the process of injection-molding the substrate, the angle of inclination $\theta$ was set at 10 mrad. The molded substrate had an angle of inclination of 10 mrad±3 mrad.

The driving apparatus for the optical record disk includes a shaft 210 for rotating the disk. As shown in a lower portion of FIG. 19, the shaft 210 has a top recess 221 formed for engagement with the bottom 193a of the hub holder 193 of the optical record disk 190. The recess 221 is defined by a cylindrical wall 222. A horizontal support 223 extends radially outward from the top of the cylindrical wall 222.

The shaft 210 includes a first protrusion 224 protruding upward from the bottom 221a of the recess 221 coaxially with the shaft. This protrusion 224 is larger in diameter than the center hole 196 of the optical record disk 190. It is possible to form the protrusion 224 by annularly cutting a peripheral portion of the bottom of the recess 221. A second protrusion 225 protrudes upward from the first protrusion 224 coaxially with the shaft 210. The second protrusion 225 has such a diameter that it can engage with the center hole 196 of the disk 190. The upper surface of the support 223 is horizontal and perpendicular to the axis of rotation of the shaft 210. When the disk 190 is mounted on the rotating mechanism 210, the support 223 is in contact with an inner peripheral portion of the underside of the disk 190 to keep the main body 194 of the disk horizontal. The shaft 210 has an annular permanent magnet 226 embedded in it around the first protrusion 224 in the recess 221 to magnetically attract the magnetic hub.

Figure 20:
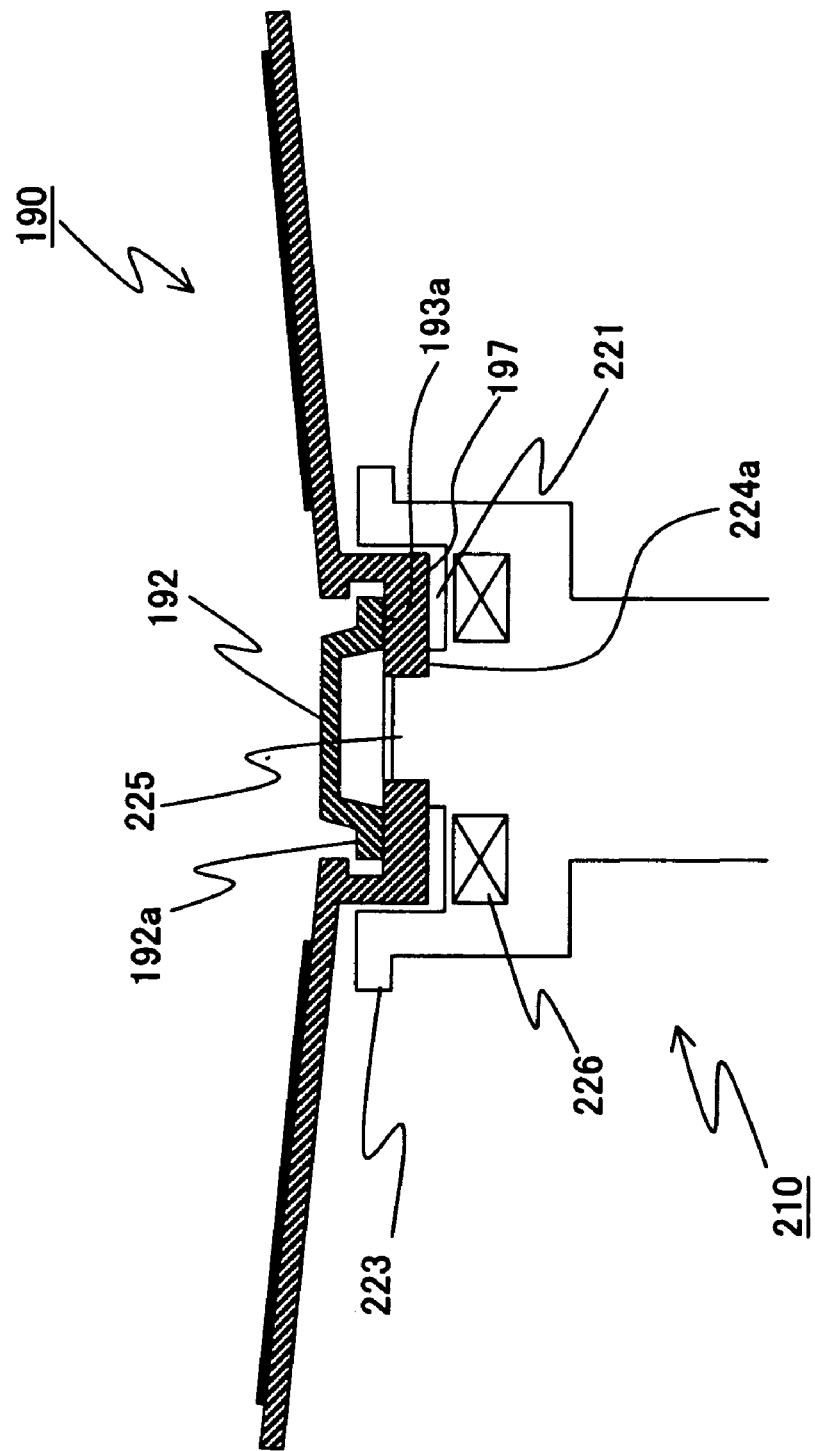
FIG. 20 is a view showing how a record disk is mounted on the drive shaft shown in FIG. 19.
Figure 21:
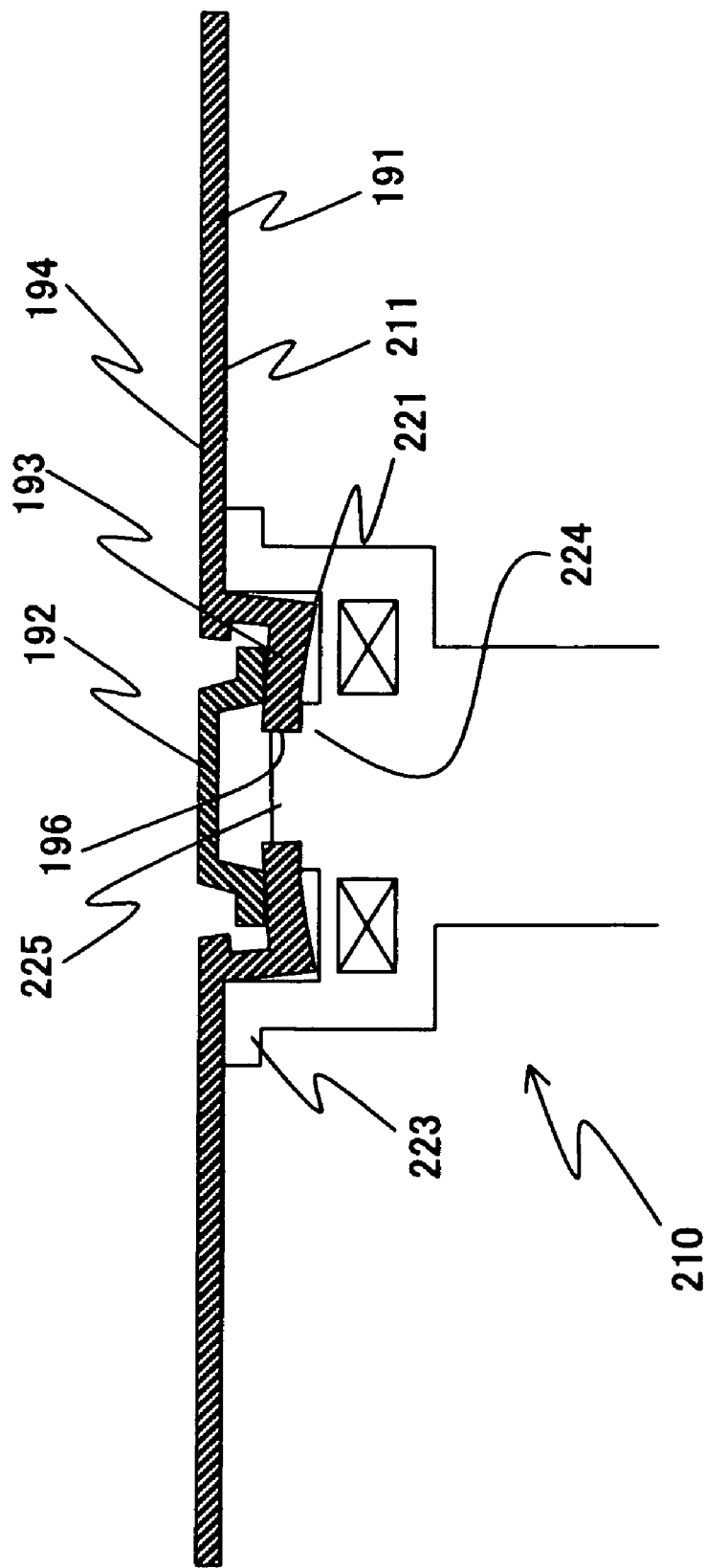
FIG. 21 is a view showing how a record disk is mounted on the drive shaft shown in FIG. 19, and how the inclination of the disk is being corrected.

When the optical record disk 190 is mounted on the driving apparatus, as shown in FIG. 20, the magnetic hub 192 placed at the center of the disk 190 is attracted magnetically by the permanent magnet 226 to be chucked. When the hub 192 is chucked, as shown in FIG. 21, its pressing force, which may range between 200 and 300 gram-weight, bends the bottom of the hub holder 193 of the disk down around the first protrusion 224. This brings the underside 211 of the disk into contact with the horizontal surface of the support 223. As a result, the horizontal surface supports the main body 194 of the disk horizontally. Accordingly, even if optical record disks have different tilts, the underside of each disk is positioned stably on the horizontal surface when the disk is mounted. For example, even if the main body of an optical record disk has a tilt of 20 mrad before the disk is mounted on the driving apparatus, the tilt decreases to 10 or less mrad when the disk is mounted on the driving apparatus and rotated. Therefore, the driving apparatus can rotate the optical record disk in a horizontal position, so that recording light or reproducing light can be radiated always perpendicularly to the recording surface of the disk. This prevents coma aberration due to the tilt of the disk, making it possible to form record marks of a desired size and reproduce recorded record marks with sufficient reproducing resolution.

Second Embodiment

FIG. 22 shows a driving apparatus according to the fifth aspect of the invention. An optical record disk identical with that of the first embodiment may be used for this embodiment. As shown in FIG. 22, the driving apparatus mainly includes a shaft 300 for rotating the optical record disk 190, a tilt sensor 237, a control unit 238 and an electric power unit 239. The shaft 300 includes a disk support 231, on which the disk 190 can be mounted. The shaft 300 has an electromagnet 236 for magnetically attracting and chucking the magnetic hub fitted on the disk 190. The disk support 231 includes a first protrusion 234 protruding upward from its top coaxially with the shaft 300. This protrusion 234 is larger in diameter than the center hole 196 of the optical record disk 190. A second protrusion 235 protrudes upward from the first protrusion 234 coaxially with the shaft 300. The second protrusion 235 has such a diameter that it can engage with the center hole 196 of the disk 190.

While the optical record disk 190 is rotating, the tilt sensor 237 can detect the tilt of the disk. The tilt sensor 237 is fitted with a light source (not shown) for irradiating the disk 190 with light. This light source and the source of recording/reproducing light that can be radiated onto the disk 190 to record or reproduce information are in common. When the disk 190 is irradiated with light from the tilt sensor 237, a signal having an amplitude equivalent to the tilt of the disk is detected from the return light from a tilt mark formed on the disk. Based on the detected signal, the disk tilt is detected. The control unit 238 generates a control signal representing the detected tilt. The control signal is sent to the power unit 239, which is connected to the electromagnet 236. The power unit 239 supplies the electromagnet 236 with a current controlled in accordance with the control signal, or the tilt. In accordance with the current from the power unit 239, the magnetic force of the electromagnet 236 varies, changing the strength to magnetically attract the magnetic hub 192. Consequently, the flange 192a of the magnetic hub 192 presses a peripheral portion of the hub holder 193 with a strength equivalent to the magnetic force of the electromagnet 236.

The pressing force of the magnetic hub 192 bends the peripheral portion of the hub holder 193 down around the first protrusion 234. As the magnetic force of the electromagnet 236 varies, the tilt of the main body 194 of the optical record disk 190 changes in the directions shown in FIG. 22. The current supplied to the electromagnet 236 is controlled by the control unit 238 in such a manner that the tilt detected by the tilt sensor 237 approximates zero. Consequently, while the disk 190 is rotated, its recording surface is kept horizontal. In the process of recording and reproducing information, the driving apparatus enables recording light and reproducing light, respectively, to be incident perpendicularly on the recording surface.

Hereinbefore, the optical record disks each including a disk substrate according to the present invention and the driving apparatus has been described in detail, but the invention is not limited to them. As an example, the driving apparatus according to the second embodiment includes an electromagnet provided in the disk support to attract the magnetic hub. In addition to the electromagnet, a permanent magnet might be provided. In this case, by using the electromagnet for fine adjustment, it is possible to reduce the electric power consumption. This results in very effective provision. The optical record disk according to the second embodiment might be housed in a cartridge, which might be mounted on the driving apparatus.

As another example, the disk substrate according to each of the first and second embodiments has a central hub receptacle. Instead of having a hub holder, the substrate might include a central part flat and flush with the main body (disk plane). The hub might be mounted on the central portion. In this case, by supporting part of the optical record disk on the support formed on top of the shaft, it is possible to so rectify the disk plane that this plane makes an angle of 10 or less mrad with a plane perpendicular to the axis of the shaft. The substrate having a main portion sloping upward axially of the shaft might be replaced by a substrate having a main portion sloping downward. In this case, the support structure and/or the hub structure might be so adjusted that, when the disk is supported on the support, the angle of inclination of the disk plane might decrease under the urging force applied magnetically by the hub to the disk.

INDUSTRIAL APPLICABILITY

An optical disk according to the first aspect of the invention includes a substrate and a hub. The contact area between the substrate and the hub is sufficient so that the frictional force between them is great. Consequently, even if the optical disk is rotated at a speed higher than the conventional speed, the substrate and hub are prevented from slipping on each other. This makes it possible to record information on and reproduce information from the optical disk rotating at high speed. It is therefore possible to provide an optical disk having a high transfer rate.

An optical disk according to the second aspect of the invention includes a substrate and a magnetic clamping hub. The outer diameter of the hub is 26 or more % of the outer diameter of the disk. Consequently, even if the optical disk is rotated at a speed higher than the conventional speed, the substrate and the hub are prevented from slipping on each other, as is the case with the optical disk according to the first aspect.

A disk substrate according to the third aspect of the invention has a novel structure where its main body (disk plane) having a recording surface, on which information can be recorded, is inclined positively with respect to a plane perpendicular to its rotational axis. An optical disk including such a substrate may be used with the driving apparatus according to each of the fifth and sixth aspects of the invention. In this case, it is possible to keep the disk plane of the optical disk substantially perpendicular to recording light or reproducing light, thereby suppressing coma aberration. The substrate can be produced without being kept horizontal with accuracy, and is therefore very easy to produce.

A disk substrate according to the fourth aspect of the invention includes a disk plane having a thickness of less than 0.8 mm. Therefore, the disk substrate can be deformed easily with the pressing force of a hub that is developed by a magnet. Accordingly, the disk substrate is suitable for an optical disk for use with the driving apparatus according to each of the fifth and sixth aspects of the invention. This driving apparatus includes a rotating shaft having a magnet fitted in it. The attraction force of the magnet presses the hub fitted on the substrate to deform the optical disk so that the disk plane of the disk can be kept at an angle of 10 or less mrad while the disk is rotating.

A driving apparatus according to the fifth aspect of the invention includes a rotating shaft having a magnet fitted in it. The magnetic attraction force of the magnet causes a peripheral portion of a magnetic hub to press and bend a peripheral portion of the hub holder of a record disk so that the main body of the disk is horizontal. By supporting the underside of the record disk on a horizontal surface of the support of the rotating shaft, it is possible to keep the disk horizontal while the driving apparatus is rotating the disk. This prevents coma aberration when recording light or reproducing light is radiated. The prevention makes it possible to record or reproduce information well.

A driving apparatus according to the sixth aspect of the invention includes a tilt sensor for detecting the tilt of a record disk while the disk is rotating. The record disk is fitted with a magnetic hub. The driving apparatus also includes an electromagnet for magnetically attracting the magnetic hub. By adjusting the current supplied to the electromagnet, the driving apparatus can control the disk tilt to keep the disk horizontal. Consequently, recording light or reproducing light can be incident on the recording surface of the record disk perpendicularly to it. This prevents coma aberration, making it possible to record or reproduce information well.

What is claimed is:

1. An optical disk for recording information thereon and reproducing the information therefrom, the optical disk being housed rotatably in a cartridge case:
    a disk substrate having a hole formed through the center thereof;
    a recording layer which is formed on the substrate and on which the information is recorded;
    a hub provided on the center of the substrate so as to be movable relative to the substrate, the hub having an outer diameter which is 26 or more % of that of the optical disk;
    the optical disk satisfies a relationship of $Y/X \geq 0.015$, where X is a projected area of the substrate and Y is a contact area between the hub and the substrate.

2. The optical disk according to claim 1, wherein the cartridge case defines a space therein, and a size of the space is 300 or more % of a thickness of the substrate.

3. The optical disk according to claim 1, wherein the cartridge case has a recess and a protrusion formed on the inner surfaces thereof which face the disk, and the recess and protrusion adjust airflow in the cartridge case while the disk is rotating and are arranged to diverge away from the center of the disk at angle between 5 and 90 degrees.

4. The optical disk according to claim 1, wherein the hub has a convex center portion with a side wall sloping at an angle between 130 and 160 degrees at half the height of the hub.

5. The optical disk according to claim 1 wherein the substrate has a thickness of 0.7 or less mm.

6. The optical disk according to claim 1, wherein the projected area X and the contact area Y satisfy the relationship of $Y/X \geq 0.02$.

7. The optical disk according to claim 1, wherein the disk is rotated at a speed of 2,400 or more rpm for recordation and reproduction.

8. A disk substrate for an optical disk which is mounted on a magnetic mounting part of a driving apparatus for driving the optical disk, comprising:
   a disk plane tilting substantially with respect to a plane perpendicular to an axis of rotation of the substrate and the disk plane tilting symmetrically with respect to the axis of rotation; and
   a hub which is attractable by the magnetic part to press the optical disk in such manner that the disk plane becomes horizontal when the disk is mounted on the mounting part of the driving apparatus,
   wherein a relationship of $Y/X \geqq 0.015$ is satisfied, where X and Y respectively denote the projected area of the substrate and the contact area between the hub and the substrate.

9. A disk substrate for an optical disk which is mounted on a magnetic mounting part of a driving apparatus for driving the optical disk, comprising:
   a disk plane tilting substantially with respect to a plane perpendicular to an axis of rotation of the substrate and the disk plane tilting symmetrically with respect to the axis of rotation; and
   a hub which is attractable by the magnetic part to press the optical disk in such manner that the disk plane becomes horizontal when the disk is mounted on the mounting part of the driving apparatus,
   wherein the hub has an outer diameter that is 26 or more % of the outer diameter of the substrate.

10. A disk substrate for an optical disk, the substrate having an axis of rotation and a thickness of less than 0.8 mm, wherein a disk plane tilts at a tilt angle θ, which satisfies $10 \text{ mrad} \leqq \theta \leqq 20 \text{ mrad}$, with a plane perpendicular to the axis of rotation after the substrate has been manufactured and a hub that can be magnetically attracted,
   wherein a relationship of $Y/X \geqq 0.015$ is satisfied, where X and Y respectively denote the projected area of the substrate and the contact area between the hub and the substrate.

11. A disk substrate for an optical disk, the substrate having an axis of rotation and a thickness of less than 0.8 mm, wherein a disk plane tilts at a tilt angle θ, which satisfies $10 \text{ mrad} \leqq \theta \leqq 20 \text{ mrad}$, with a plane perpendicular to the axis of rotation after the substrate has been manufactured and a hub that can be magnetically attracted,
   wherein the hub has an outer diameter that is 26 or more % of the outer diameter of the substrate.

12. A driving apparatus for recording and reproducing information by radiating light onto the recording surface of a record disk including a hub that is magnetically attracted to press a part of the disk, comprising:
   a light source for irradiating the record disk with light;
   a tilt sensor for measuring a tilt angle of the recording surface of the record disk relative to the optical axis of the light incident on the disk;
   a rotating shaft for rotating the record disk;
   an electromagnet embedded in the rotating shaft; and
   a controller for controlling the magnetic field intensity of the electromagnet based on the tilt angle detected by the tilt sensor, and for adjusting the force with which the hub presses the disk plane of the record disk.

13. The driving apparatus according to claim 12, wherein the disk plane substantially tilts with respect to a plane perpendicular to the axis of rotation of the record disk.

14. The driving apparatus according to claim 13, wherein the controller controls the electromagnet to rotate the record disk so that the disk plane makes an angle of 10 or less mrad with the plane perpendicular to the axis of rotation.

15. The driving apparatus according to claim 12, wherein the record disk has a thickness of less than 0.8 mm, the disk plane tilts at a tilt angle θ, which satisfies a relationship of $1 \text{ mrad} \leqq \theta \leqq 20 \text{ mrad}$, with a plane perpendicular to the axis of rotation of the disk.

16. The driving apparatus according to claim 12, wherein the record disk includes a cylindrical receptacle for holding the hub, and the receptacle has a hole formed through the bottom thereof coaxially with the axis of rotation of the disk.

17. The driving apparatus according to claim 16, wherein the disk plane tilts at an angle θ with a direction perpendicular to the axis of rotation away from the bottom of the cylindrical receptacle, and the angle θ satisfies a relationship of $1 \text{ mrad} \leqq \theta \leqq 20 \text{ mrad}$.

18. The driving apparatus according to claim 16, wherein the rotating shaft includes a support on top, on which the cylindrical receptacle can rest, and the support includes:
   a first columnar protrusion protruding coaxially with the rotating shaft and having an outer diameter larger than that of the hole in the bottom of the record disk; and
   a second columnar protrusion protruding from the first protrusion coaxially with the rotating shaft.

* * * * *

UNITED STATES PATENT AND TRADEMARK OFFICE
CERTIFICATE OF CORRECTION

PATENT NO. : 7,027,385 B1  Page 1 of 1
APPLICATION NO. : 09/830928
DATED : April 11, 2006
INVENTOR(S) : Katsusuke Shimazaki et al.

It is certified that error appears in the above-identified patent and that said Letters Patent is hereby corrected as shown below:

On the Title page item [54], and col. 1, line 1,

Change "OPTICAL DISK, DISK SUBSTRATE, AND DRIVE" to -- OPTICAL DISK, DISK SUBSTRATE AND DRIVING APPARATUS--.

Signed and Sealed this

Eighth Day of August, 2006

JON W. DUDAS
*Director of the United States Patent and Trademark Office*